US007649881B2

(12) United States Patent
Casey

(10) Patent No.: US 7,649,881 B2
(45) Date of Patent: Jan. 19, 2010

(54) PINNING THE ROUTE OF IP BEARER FLOWS IN A NEXT GENERATION NETWORK

(75) Inventor: Liam Casey, Ottawa (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 353 days.

(21) Appl. No.: 11/610,794

(22) Filed: Dec. 14, 2006

(65) Prior Publication Data

US 2008/0144615 A1 Jun. 19, 2008

(51) Int. Cl.
*H04L 12/28* (2006.01)
*H04J 3/24* (2006.01)
(52) U.S. Cl. ...................... 370/389; 370/473
(58) Field of Classification Search ............... 370/389, 370/473
See application file for complete search history.

(56) References Cited

U.S. PATENT DOCUMENTS

| 6,373,817 | B1 * | 4/2002 | Kung et al. ............ 370/217 |
| 7,072,303 | B2 * | 7/2006 | MeLampy et al. ....... 370/238 |
| 7,133,923 | B2 * | 11/2006 | MeLampy et al. ....... 709/231 |
| 7,414,981 | B2 * | 8/2008 | Jaramillo et al. ....... 370/252 |
| 2002/0036983 | A1 * | 3/2002 | Widegren et al. ....... 370/230.1 |
| 2002/0196741 | A1 * | 12/2002 | Jaramillo et al. ....... 370/252 |
| 2004/0109455 | A1 | 6/2004 | Jouppi et al. |
| 2005/0265278 | A1 | 12/2005 | Hsu et al. |
| 2005/0271003 | A1 | 12/2005 | Devarapalli et al. |
| 2006/0039397 | A1 | 2/2006 | Hari et al. |
| 2006/0206504 | A1 | 9/2006 | Cai et al. |
| 2006/0239255 | A1 | 10/2006 | Ramachandran et al. |
| 2006/0251043 | A1 | 11/2006 | Madour et al. |

FOREIGN PATENT DOCUMENTS

| EP | 1720365 | 11/2006 |
| WO | 2004084502 | 9/2004 |

OTHER PUBLICATIONS

International Search Report Issued on Applicant's corresponding International PCT Application Serial No. PCT/CA2007/002045 on Feb. 29, 2008.

* cited by examiner

*Primary Examiner*—Dang T Ton
*Assistant Examiner*—Frederick Ott
(74) *Attorney, Agent, or Firm*—Ogilvy Renault LLP

(57) ABSTRACT

Methods and systems for extending the IMS/SIP architecture of the NGN to provide QoS service to generic bearer flows. More particularly, a method is provided for establishing an bearer end-to-end path of a communication session in a multi-domain communication network in which an out of band signalling protocol is used to establish communications sessions. The method comprises receiving an out-of-band signalling message including information representative of at least an opposite end point of a first bearer segment of the end-to-end path. The information is used to define a cross-connect mapping through a node of the network between respective local endpoints of the first bearer segment and a second bearer segment hosted by the node. Information representative of the cross-connect mapping is then inserted into the out-of-band signalling message, and the out-of-band signalling message forwarded.

26 Claims, 14 Drawing Sheets

PINNING THE ROUTE OF IP BEARER FLOWS IN A NEXT GENERATION NETWORK

CROSS-REFERENCE TO RELATED APPLICATIONS

This is the first application directed to the present invention. This application is related to U.S. patent application Ser. No. 11/610,788, entitled Serving Gateway Proxies for Non-SIP Speakers in a Next Generation Network; and Ser. No. 11/610,780, entitled Providing SIP INTERWORKING in a Next Generation Network, both of which are being filed concurrently with the present application.

TECHNICAL FIELD

The present invention relates to Next Generation Networks, and in particular to pinning the route of Internet Protocol (IP) Bearer Flows in a Next Generation Network.

BACKGROUND OF THE INVENTION

At the present time, various international standards bodies and consortiums, such as the Third Generation Partnership Project (3GPP), European Telecommunications Standards Institute (ETSI) and the International Telecommunications Union (ITU), are participating in initiatives for defining a Next Generation Network. According to ITU-T, the Next Generation Network (NGN) is a packet-based network able to provide services including Telecommunication Services and able to make use of multiple broadband, QoS-enabled transport technologies and in which service-related functions are independent from underlying transport-related technologies. The NGN offers unrestricted access by users to different service providers. It also supports generalized mobility which will allow consistent and ubiquitous provision of services to users."

The Next Generation Network is generally based upon the Internet Multi-Media Sub-system (IMS) architecture, and utilizes Session Initiation Protocol (SIP) for managing the set-up and tear-down of communication sessions between parties. This arrangement is advantageous in that IMS/SIP provides a framework for Internet Protocol (IP) networks to establish multimedia sessions, including Voice over Internet Protocol (VoIP) phone calls, in a way that is fraud resistant, and which allows for the subsequent accounting and inter-domain settlements to be undertaken using methods very similar to those currently employed by Public Switched Telephone Network (PSTN) and cellular network operators. That is, users can be billed for each individual call/session with the charge related to the type of service delivered, and these charges can be properly distributed to each of the bearer networks (or administrative domains) traversed by the call/session.

As with the PSTN, it is envisaged that the NGN will consist of many operators/administrative domains, and the IMS architecture provides the basis for a subscriber of one operator to establish a voice call or multimedia session with a subscriber of another operator, with both operators (and any intermediate operators) reserving the necessary network resources in their respective administrative domains to support the Quality of Service (QoS) required for the bearer packet flows that carry the voice or multimedia streams associated with that session. Further, the IMS architecture fully supports the roaming of end users, with the visited domain supporting bearer flow QoS in the same fashion as the home domain would.

FIG. 1 schematically illustrates a representative Next Generation Network architecture. As in the PSTN and the Internet, the NGN is expected to be a conglomeration of multiple administrative domains' networks. An administrative domain's business may be primarily that of serving end customers or primarily that of providing transit to other administrative domains. For the purposes of this application, the network of a transit providing administrative domain is referred to as a Transit Network (TN)2. An administrative domain that serves end customers consists of two types of network: a core IP network (CN)4 and one or more attachment (or "access") networks (ANs)6 that "attach" end customers' terminal equipment (TEs)8 to the core network4, via an Attachment Gateway 10, so that they can receive IMS service. ANs are normally considered to be in the same administrative domain as the CM they connect to, even when they are operated by a separate business entity (an AN operator) from whom the CN operator buys "wholesale access". Note that while both Transit Networks and Core Networks route IP packets based upon the destination IP address in each packet's header, ANs transport packets between TEs and the attachment point of the CN, without regard to IP addresses. While an attachment network can be as simple as a wire or a Time Domain Multiplexed (TDM) circuit, it usually consists of a media specific first mile network and a more general packet backhaul network (in 3GPP wireless terminology this backhaul network is denoted by the term "core", but it is still part of the AN, and not to be confused with the CN).

In the network architecture illustrated in FIG. 1, packets are transported between the various core and transit networks by Exchange Links 12 hosted by Transport Border Gateways (TBGs) 14 in each network. For any pair of networks an Exchange Link may be a physical link or some form of virtual circuit. Those skilled in the art will recognize that multiple networks can also be interconnected over a connectionless exchange Network (XN). An XN may range in scope from a single Ethernet switch to a global IP network or Virtual Private Network.

IMS is specified to use Session Initiation Protocol (SIP) to set up and take down multimedia calls or sessions. The IMS architecture specifies a number of Call State Control Functions (CSCFs) 16 distributed through the network that process and act upon the SIP messages. In the establishment of a specific session, SIP messaging needs to be processed by at least an originating Serving CSCF (S-CSCF) associated with the originator of the session, and a destination S-CSCF associated with the target or destination of the session set up. Usually however SIP clients do not peer directly with their associated S-CSCFs and there are intermediate CSCFs routing and forwarding SIP messages between SIP clients and their associated S-CSCFs, and between originating and destination CSCFs. Of particular relevance to the present application are the peer CSCFs responsible for forwarding SIP messages between administrative domains. In the present description we designate any CSCF that is the last one in an administrative domain to forward a SIP message to another domain, or the first in an administrative domain to receive a SIP message from another domain, as a border CSCF (b-CSCF). Those familiar with 3GPP and/or other NGN standards thrusts will recognize that there is some debate as to how border control functionality will be architected. The term "b-CSCF" is intended to encompasses such functional components as an interrogating-CSCF (I-CSCF), Interconnection Border Control Function (IBCF) and aspects of a Breakout Gateway Control Function (BGCF) Even an S-CSCF may be a b-CSCF when border control is not a strong operator requirement.

There are no CSCFs in attachment networks—the peer of the so called proxy-CSCF (P-CSCF) is actually the SIP client function of the terminal equipment. Since a SIP client, particularly in an application server (AS) 8b might peer directly with an S-CSCF, in the present description we use the term perimeter-CSCF (p-CSCF) to refer to the CSCF that is the first one/last one handling SIP messages from/to SIP clients 8. FIG. 1 depicts the relevant CSCFs in the establishment of a session between a roaming TE 8 (attached to a visited core network) and an AS 8b where the home core networks are separated by a Transit Network 2.

A media stream of a session is transported across a network as a bearer (packet) flow. In an IP packet environment, the bearer flow path is not automatically the same as the path traversed by the SIP signalling, because the bearer flow path it is not required to pass through nodes hosting CSCF functions. Inter domain bearer flows exit and enter administrative domains at nodes herein designated as Transport Border Gateways (TBG) 14. Again, the situation between attachment network and core network is different; the node in the core network that interfaces to the attachment network is variously called the Service Edge, Core Network Edge, Border Node, Access Media Gateway, Access Router or access network type specific terms such as GPRS Gateway Support Node (GGSN) or Broadband Remote Access Server (BRAS). In this description we will use the term Attachment Gateway (AG) 10. The AG straddles the boundary between AN 6 and CN 4.

Specifying Bearer Flow QoS Requirements

As it is known in the art, the SIP messages that initiate a session carry a description of the bearer flow (or multiple bearer flows if required) that is to be associated with the session. This description is in the form of parameters of Session Description protocol (SDP). See, for example, Handley, M. and V. Jacobson, "SDP: session description protocol"; Request for Comments 2327, April 1998. Currently the SDP part of the SIP message gives a complete description of what the bearer flow is to contain (i.e. voice or video and what codecs and bit rates to be used). This information was originally intended to enable the end systems to specify how they wanted to encode voice or video data into real time protocol (RTP) packets.

In the IMS solution, the SDP parameters may also be interpreted by CSCFs in the Various network domains interposed between the end systems, in order to determine what the bearer paths' network characteristics. Usually this information is derived from the media lines (starting with m=) the SDP. For example the last parameter in:

m=audio 8004 RTP/AVP 9 indicates an audio bearer flow that is encoded according to audio visual profile (AVP) 9, which happens to be G.722, which is a 64 kb/s stream (the network requirement has to include packet headers etc as well pushing it up to around 100 kb/s).

Based upon the SDP parameters, the CSCFs perform a process that goes by the name of connection admission control (CAC), although the process would be more accurately called Session Admission Control. The CAC process determines the resource requirements of the bearer flow(s) so that the embedded media stream(s) can be delivered with the expected QoS. If a domain does not have the resources to support a new bearer flow, then the relevant CSCF will abort the Session setup. A description of this (for p-CSCFs and AGs) is provided in the 3GPP document <<3GPP TS 23.207>>.

Traffic Classes

Traffic class is a somewhat amorphous concept that is captured by different terms in different traffic management models. In the IETF IntServ model there are three traffic classes: "guaranteed", "controlled load", and "best effort". Somewhat analogously, the IETF DiffServ Model provides three types of traffic forwarding behaviors: Expedited Forwarding (EF), Assured Forwarding (AF) (although there can be up to 4 classes of AF traffic) and Default or Best Effort. ITU study groups define traffic classes for services in terms of delay and jitter (as well as throughput) plus factors such as packet loss rate and what to do with packets that are out of spec, or late.

In practical deployments of the NGN there will be a traffic class where both the delay and jitter will be the minimum possible, to be used for real-time conversations (or an operator may opt for several such classes, one for voice conversations, one for video telephony, one for gaming), and another class that guarantees throughput with bounded jitter which is suited for media stream play out (again an operator may choose to distinguish between voice and video). Since there are never any resources dedicated to best effort traffic there is little utility in using SIP to establish a best effort bearer flow, but for completeness there may be such a code point defined.

Scope of QoS Control and Treatment

FIG. 2 illustrates a bearer flow 18 divided into segments 20. Each segment 20 of a bearer flow traverses a single packet transport network 2-6 and is delimited by an end device or a gateway 14. Bearer flow segments 20 can be named by the type of network they are transported on: Attachment segment for the part, of the bearer flow that crosses the attachment network, etc.

The need to provide special treatment to bearer flow packets may not extend end to end. It is widely accepted that if a particular packet transport network is over provisioned, then the QoS treatment given to all packets will be adequate to support any particular bearer flow. Those skilled in the art will also recognize that Diffserv may be used to simulate over provisioning for specific classes of traffic. It is envisaged that some, or all, core networks will be over provisioned (or use Diffserv to simulate over provisioning for IMS packets), with the consequence that there will be no need to reserve resources for the core segments of bearer flows traversing such over provisioned core networks. However it is very likely that resources will have to be reserved for attachment segments in order to ensure that the transport of a flow's packets over those segments does not degrade the QoS of the end to end flow beneath that acceptable for the service the flow is supporting.

Resource and Admission Control Function (RACF)

The function of reserving resources for a bearer flow is closely related to admission control for the session of which the bearer flow is a constituent. If, given the current commitments to existing sessions, there is insufficient bandwidth capacity on links, forwarding capacity at nodes, or a lack of other resources needed to deliver the requested QoS for a bearer flow of a new session, then the session establishment is aborted and any resources already reserved for that session are released.

More generally, before a session is established, a number of policy decisions need to be made concerning whether to admit the session or not. In the IMS architecture these decisions originate at CSCFs, triggered by the processing of the first message in a session set up: the SIP INVITE message. The execution of some policy decisions is confined to the CSCF, but those concerning bearer flow QoS are signaled to the gateways that will handle the bearer flow, by the controlling CSCFs. FIG. 3 illustrates, for a session involving two domains, the control of the RACF function in attachment gateways (AGs) 10 and transport border gateways (TBGs) 14 by p-CSCFs and b-CSCFs respectively. Those familiar with NGN standards will recognize that in the IMS architecture, between CSCFs and Gateways, there are intermediate Policy Decision Functions (PDFs), forming the RACS (Resource and Admission Control Subsystem) network layer. As well as arbitrating between different applications requesting QoS bearer flows, a PDF may present to CSCFs an abstract view of attachment network QoS control specifics, as well as hiding the topology of AGs and TBGs.

In spite of its advantages, the NGN suffers limitations in that the route(s) traversed by Internet Protocol (IP) packets of a bearer flow is determined by conventional packet forwarding techniques, and thus may or may not follow the route traversed by the SIP messaging used to establish the flow. This provides a barrier to deployment of the NGN, as it is impossible for a network provider to properly associate IP packets traversing their network domain with a particular bearer flow, and this, in turn prevents proper billing settlements similar to those currently employed by Public Switched Telephone Network (PSTN) and cellular network operators.

Accordingly, methods and techniques that enable pinning this route of Internet Protocol (IP) Bearer Flows in a Next Generation Network remain highly desirable.

SUMMARY OF THE INVENTION

An object of the present invention is to provide methods and techniques that enable pinning the route of Internet Protocol (IP) Bearer Flows in a Next Generation Network.

Thus, an aspect of the present invention provides, in a multi-domain communication network in which an out of band signalling protocol is used to establish communications sessions, a method of establishing a bearer end-to-end path of a communication session. The method comprises receiving an out-of-band signalling message including information representative of at least an opposite end point of a first bearer segment of the end-to-end path. The information is used to define a cross-connect mapping through a node of the network between respective local endpoints of the first bearer segment and a second bearer segment hosted by the node. Information representative of the cross-connect mapping is then inserted into the out-of-band signalling message, and the out-of-band signalling message forwarded.

The present invention is not specific to any particular traffic management model, but rather assumes merely that there will be some plurality of traffic classes agreed upon by operators, and the desired traffic class for a bearer flow can be specified as a parameter in SDP.

The present invention assumes that for every AG there is a p-CSCF (and likewise, for every TBG there is a b-CSCF), that can request QoS treatment for bearer flows that pass through that gateway, irrespective of the number, if any, of intermediate PDFs, nodes and specific protocol choices for their intercommunication. The QoS treatment of a bearer segment of a particular bearer flow may be set in a single ended fashion by pushing a policy to the gateway at one end of the segment, or may be set in a double ended fashion by pushing a policy to the gateways at both ends of the segment. As defined above, a gateway is the end point of one bearer segment of a bearer flow and the start of its next segment: a single policy pushed to the gateway may serve to request QoS resources for both segments.

Those skilled in the art will recognize that there are several different methods for requesting a gateway to provide QoS for a bearer segment: so-called "PUSH" methods result in the gateway receiving directly from the CSCF (or through a hierarchy of policy decision functions) a "policy decision" to provide a bearer segment with a specified QoS and the gateway then replying to the CSCF that either it has the resources to "enforce" the policy, or that it does not have the resources. The descriptions that follow are phrased in terms of the "PUSH" model of RACS, but the present invention is intended to work independently of how QoS requirements are communicated to gateways. Indeed, as those skilled in the art will recognize, a "bandwidth broker" might keep track of bandwidth resources over a link or network without ever signalling to the gateways at the end points. However, given that segments stare or end at inter-domain boundaries, there are extra reasons that the gateways will have specification of a new bearer segment signalled to them: policing bearer flows, changing Diffserv markings, generating accounting records. While it is unlikely that actual resource reservations need to be made on exchange links or networks, a RAC function will likely be invoked by b-CSCFs in order to check the adherence to the policy of each administrative domain as to the type and quantity of flows it is prepared to accept from the other.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

Figure 1:
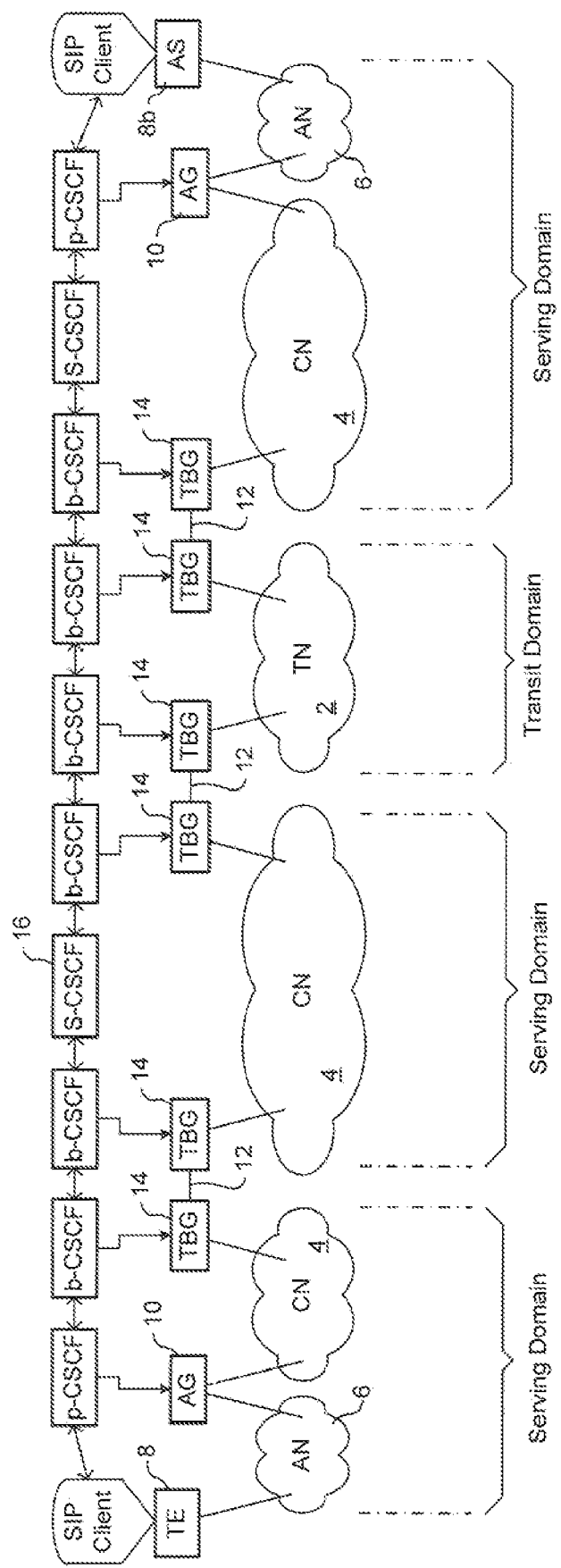
FIG. 1 is a block diagram schematically illustrating a representative Next Generation Network in which methods of the present invention may be implemented.

The present invention provides methods and techniques that enable QoS Treatment of Generic Bearer Flows in a Next Generation Network. Embodiments of the present invention are described below, by way of example only, with reference to FIGS. 4-14

In general, the present invention provides methods and systems which can be used, either alone or in combination, to extend the IMS/SIP architecture of the NGN to provide QoS service to generic bearer flows. These methods and systems can be broadly divided into four categories, namely: extension of SIP to generic bearer flows; pinning of a bearer flow of a communications session, to AGs and TBGs traversed by the SIP signalling used to set up the session; support for non-SIP clients; and gateway functionality for legacy IP signalling. Each of these categories will be explained, by way of representative example, in the following description.

It should be noted that the present application is directed primarily to techniques for pinning a bearer flow to AGs and TBGs traversed by the SIP signalling used to set up the session. Techniques for supporting non-SIP clients, and gateway functionality for legacy IP signalling, respectively, are the focus of Applicant's co-pending U.S. patent application Ser. No. 11/610,788, entitled Serving Gateway Proxies for Non-SIP Speaker's in a Next Generation Network; and 11/610,780, entitled Providing SIP Interworking in a Next Generation Network, both of which are being filed concurrently with the present application.

Generic Bearer Flows

SIP and IMS, as currently defined, suffer a limitation in that they only deal with bearer flows that are multimedia streams. However, many other useful applications could take advantage of the IMS infrastructure if their bearer flows were recognized by IMS.

According to one aspect of the present invention, this limitation can be overcome by adding explicit traffic specification (T-Spec) parameters describing the QoS requirements of generic bearer flows to the SDP in SIP signalling; and extending the RACS mechanisms in IMS to interpret the new T-Spec parameters. Adding explicit T-Spec parameters in the SDP part of SIP signaling enables two SIP endpoints to request the network to perform resource allocation and/or connection admission control for any arbitrary flow; a generic bearer flow. Thus, whereas for an RTP or multimedia bearer flow the IMS functional elements deduce the resource requirements from the media encoding and other media descriptive SDP parameters, for generic bearer flows the CSCFs will use the explicit T-Spec parameters as the basis for the resource and admission, control process.

For example, consider a network in which the class of service designations of ITU recommendation Y.1541 are adopted. In such a case, following the guidelines of RFC 2327, the explicit T-Spec could consist of two media-level attribute lines, one specifying the Y.1541 class of service and the other specifying the capacity or bandwidth required. Thus:

a=ITU-CLassOfService:0
a=ITU-Capacity:100 could be used to specify that the bearer flow required 100 kb/s and a service class 0 (i.e. an end to end delay of less that 100 msecs etc. as per Y.1541)

Other methods may be used to express the explicit T-Spec parameters, if desired. For example, in the representation implementation described below, operators may choose to assign names to combinations of bandwidth and traffic class, which enables the explicit T-Spec to be provided using a single SDP attribute (i.e. the assigned name).

EXAMPLE USE

A traveling enterprise employee uses a VPN client to establish an IPSec tunnel back from her laptop to her Enterprise's VPN server so that she can access the facilities of the enterprise network, including its IP PBX to make and receive phone calls. If this IPSec tunnel were established over the best effort Internet the delays, litter and loss rate of the encrypted packets would be uncertain and could be inadequate to support a VoIP session between the soft client on her laptop and the enterprise IP PBX. To get guaranteed QoS suitable for voice packets in the IPSec tunnel requires that the IPSec tunnel be treated as a generic bearer.

Operators supporting generic bearers may choose to tariff a limited number of bandwidths (transfer capacity) for each traffic class, and then to give each combination of transfer capacity and traffic class a standard name. An example might be:

votel=100 kb/s minimum delay, minimum jitter, tariff $0.02 per minute,
vidtel=1 Mb/s minimum delay, minimum jitter, $0.10.
sdtv=1.5 Mb/s downstream, guaranteed throughput, $0.03;
hdtv=8 Mb/s downstream, guaranteed throughput, $0.06;

intended for voice telephony, video telephony, standard definition video streaming and high definition video streaming respectively. The standard name would then be used as the sole T-Spec parameter in the SDP part of SIP messages. In this example, assigning "votel" QoS to the generic bearer will be adequate to support the users VoIP sessions The VPN Server at the Enterprise site is attached to some operator's NGN network and is registered with that domain. Assume for the present description that, if there are multiple administrative domains between VPN client and VPN server, the normal routing behavior for IP packets between VPN client and VPN server traverses the same chain of domains as would SIP signaling, and that there is no ambiguity as to which TBGs 14 the packets use (pinning bearer flows to use specific TBGs is described in detail below).

The SIP client part 22 of the VPN client 8 registers in the public IMS domain. As a result, according to the normal operation of IMS, a home s-CSCF can now send the client SIP signaling messages. (Note that the SIP client part 22 of the VPN client 8 is distinct from the soft phone SIP client on the laptop—they may share common code but ultimately the soft phone SIP client will register with the enterprise IP PBX. An alternative realization might use a single SIP client that can be dual registered).

The establishment of a security association between VPN client 8 and VPN server then proceeds in the usual manner using the IKE (Internet Key Exchange) protocol sequence, with the proviso that the identity asserted by the VPN client in its IKE messages must be translatable by the VPN Server in to the SIP identity (URI) of the VPN client. This could be assured by having the VPN client's identity be its SIP URI, but for even greater security the client's SIP address could returned as a result of the authorization process (e.g. part of a RADIUS or DIAMETER response).

Once the VPN Server has authenticated the client (in fact after both phases of the IKE have completed), it places a "call" to the VPN client by issuing a SIP INVITE message in the public domain. The F-Spec in the SDP identifies the tunnel end points that have been agreed upon. (Note that standard IPSec packets do not have port, numbers in their headers but rather a Security Parameter Index field that is unique to each tunnel between a given pair of addresses. This field could be used in the F-Spec but in fact, because of the existence of HAT in networks, the normal mode of tunneling for VPN access style of operation is for IPSec packets to be encapsulated in UDP datagrams, thus the normal style of F-Spec serves to identify the IPsec tunnel flow of packets.) In one mode of operation the T-Spec for a VPN client is returned to the VPN server as part of the authorization process, that is, each VPN client always has a fixed QoS level set by an administrator. In this case the T-Spec is included as part of the SDP in the INVITE message from the VPN Server.

In the normal fashion of IMS, the SIP INVITE signaling message is forwarded through the public IMS CSCFs to the SIP client part of the VPN client.

The client first needs to associate the incoming signaling with the security association (we assume that the Security Parameter Index is included in the SDP even if not part of the F-Spec, see above). In a mode of operation where the VPN client user gets to choose the service class required (e.g. the user could specify if they intended to make/receive voice calls or video calls) the VPN client will create a T-Spec for the tunnel and include it in the SIP response back to the VPN server. (Presumably the response will be a 200 OK message).

The IMS system establishes the session, informing the AGs and TBGs that the IPSec tunnel traverses of its F-Spec, and instructing them to provide QoS treatment as specified by the T-Spec. The IMS system will also generate the required accounting records so that subsequently the enterprise can be billed for the service.

The IPSec tunnel between the VPN server to the client is now a generic bearer path; packets sent by client or server that match the F-spec are assured the specified QoS treatment in every domain they traverse. Notice that as encryption hides the real headers of ail packets in the tunnel all packets get uniform QoS treatment. Also, because IPSec may rely on sequence integrity it is not a good idea to transfer original diff-serv markings to IPSec packet headers and use them to give different QoS treatments to different classes of packet. Rather if an implementation wants to restrict traffic in the IPSec generic bearer to just (encrypted) multimedia streams then it will have to establish separate IPSec tunnels for multimedia stream and best effort traffic—there is no need to request QoS treatment using SIP for a best effort tunnel but different IPSec tunnels could be established for different types of flow, each signaled with separate T-Spec parameters.

The VPN server terminates the SIP session as soon as the security establishment is lost.

These skilled in the art will recognize that there are many variations on the above. In particular it may not be the case that QoS treatment for the IPSec tunnel is requested from the network for the duration of the tunnel establishment, but only when a voice call is actually being initiated or even only when the monitored performance of best effort transport falls below some threshold during a call. Further enhancements could have the server establish a generic bearer flow with minimal QoS treatment as soon as the IP-Sec tunnel was initiated, but then the server could use a SIP reINVITE to modify the service class/bandwidth of the flow in response to snooping messages within the tunnel (such as SIP messages between the soft phone client and IP PBX) and/or at the request of servers within the enterprise domain.

Pinning Bearer Flows

As shown in FIG. 1 the end points of a session may be attached to different (core) networks with the SIP signaling and bearer flow(s) for a session traversing several domains. Currently not much attention has been paid in IMS to the path that packets in a bearer flow follow—it is generally assumed that they will follow the path determined by IP routing. On the other hand, the routing of SIP signaling is at least partially defined to be via a series of CSCFs, where the CSCFs are pair-wise peers of each other. In the NGN the forwarding choices for SIP messages at each CSCF are dictated by policy (based on commercial agreements for transit etc.). Thus it is that in the case where originator and terminator are in different domains, the intermediate domains traversed by the SIP signaling need not all be the same domains that an IP packet sent from the originator and addressed to the terminating party would traverse under the normal operation of IP forwarding rules.

However there are two good reasons why the path of a bearer flow should not just be determined by IP routing but rather be explicitly set to traverse specific domains and specific transport border gateways (TBGs). Firstly, from a commercial perspective, it is a likely strong requirement that a session's bearer flows not traverse domains that did not participate in the signaling for the session for the reason that if the domain does not know what session a flow belongs to it cannot generate accounting records for it. Secondly, the delivery of QoS to a bearer flow usually requires network elements on the path to be informed of the authorization of the bearer flow to receive the QoS. Consequently for QoS over the core networks and/or over exchange links the path of the bearer flow has to be constrained to pass through (to be pinned to) TBGs chosen by b-CSCFs at session establishment time, since b-CSCFs can only send authorizations to TBGs that they control.

In addition to the two above reasons for pinning bearer flows, a CSCF involved in establishing a session may determine that a bearer flow needs to pass through a media gateway of some type. A media gateway may be required in the bearer flow path to perform a transcoding of media samples because the session end points do not have mutually common codecs. Another usage of media gateways may be because one of the end points is subject to a lawful intercept (LI) order and the media streams of the session need to be passed through a LI gateway so that a copy of them can be made to be securely forwarded to the relevant legal authority.

Figure 2:
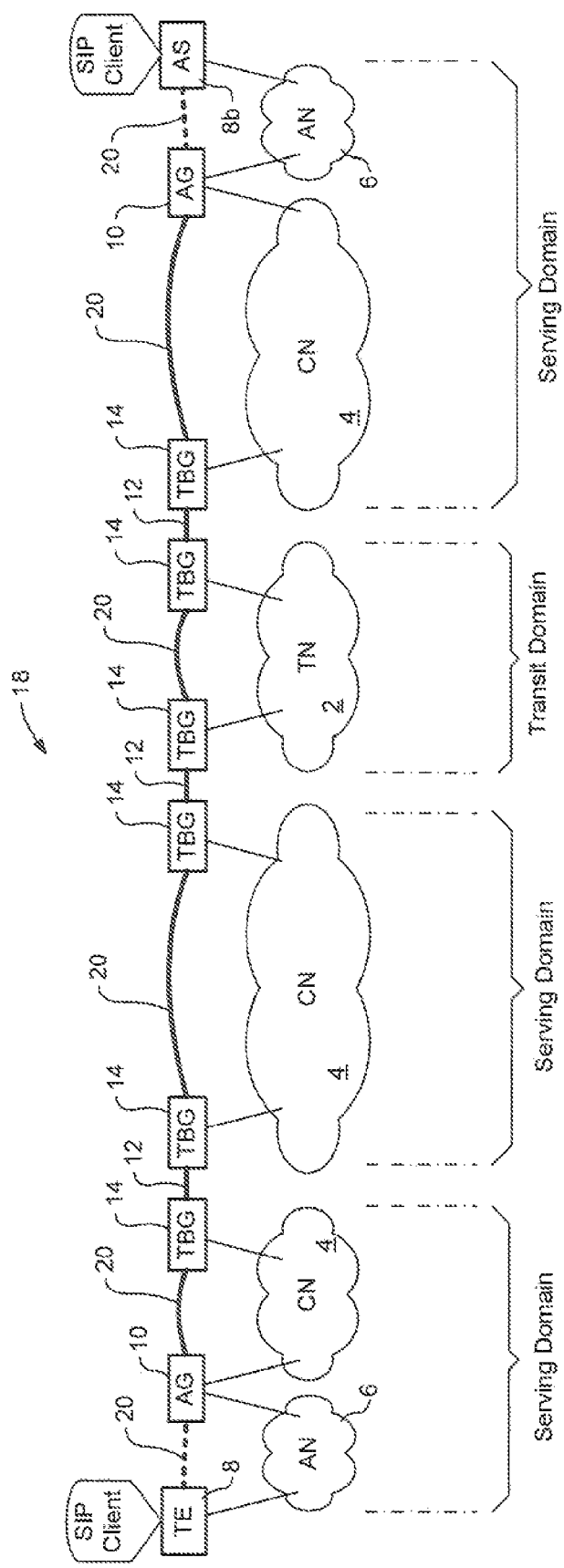
FIG. 2 is a block diagram schematically illustrating bearer flew segments in the network of FIG. 1.
Figure 3:
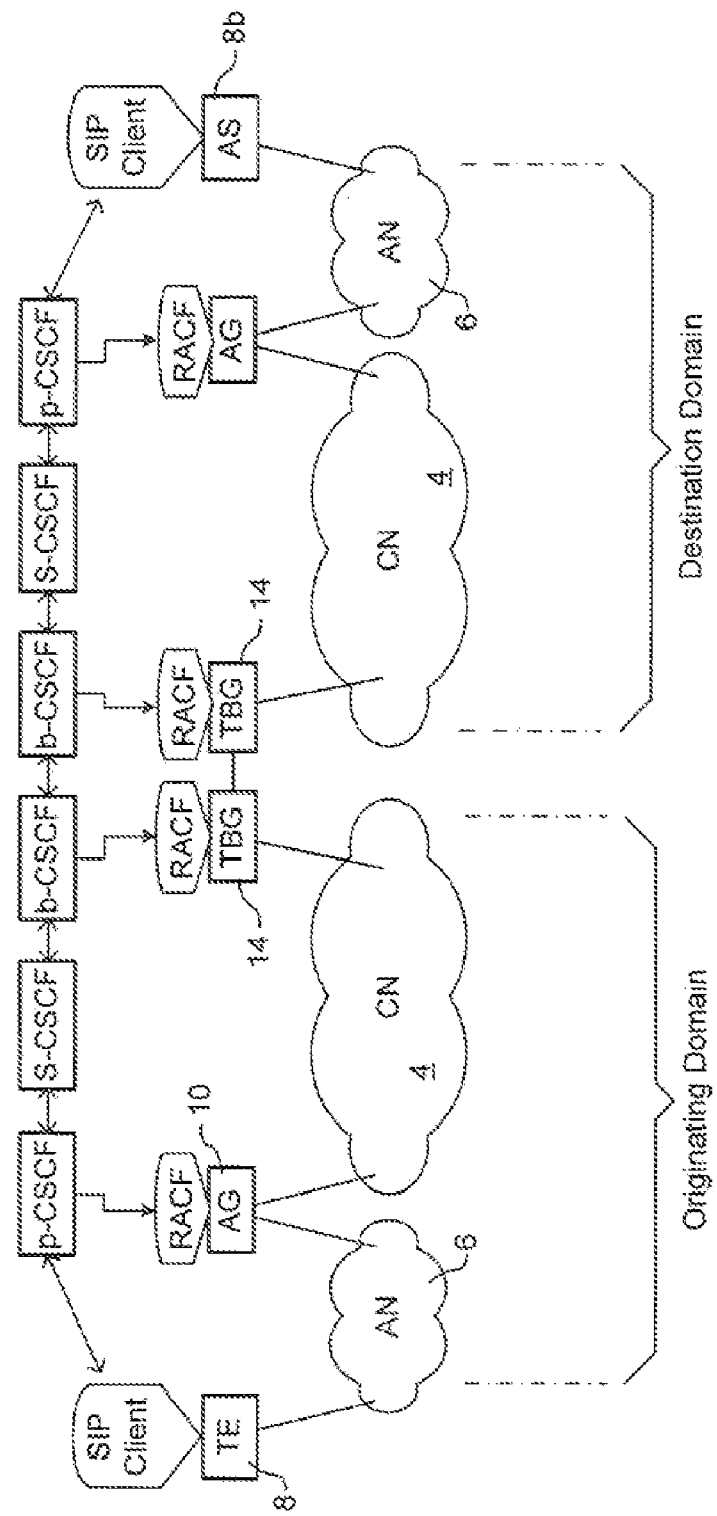
FIG. 3 is a block diagram schematically illustrating, for a session involving two domains, control of the Resource and Admission Control Function.

A second aspect of the present invention provides a path pinning mechanism for the bearer flows of a session to cause bearer packets to traverse through a specific chain of gateways determined at session establishment. The following description and FIGS. 4-6 concentrate on pinning bearer flows to transport border gateways (TBGs), but its extension to cover pinning to other gateways (media translation, lawful intercept etc.) will be readily apparent, to those skilled in the art based on the description provided herein. As described earlier, and depicted in FIG. 2, a bearer flow can be partitioned into a serial concatenation of bearer (flow) segments 20. Except, for the start of the first flow segment and the finishing point of the last segment, these bearer segments start and finish at gateways 14. When a bearer flow is to be pinned to TBGs 14, the start and finish points of intermediate bearer segments 20 are TBGs 14.

Note that because attachment networks 6 do not follow IP forwarding, the traffic for a specific terminal 8 or server 8b is pinned to a specific AG 10 for the duration of its attachment to the network, that is the first and last bearer segments are always in place. The disclosed mechanism acts to pin bearer paths between AGs 10.

Network Element Capabilities

The mechanism to pin bearer flows is disclosed below in three parts. First is described how it works when all network elements are in the same IP address realm; then is described how it would work when the client TE is in a private IP address realm, but all the operator domains are in a single IP address realm; and finally the workings for when different core networks belong to different IP address realms. In all three cases the same capabilities are assumed, namely:

Gateways (including TBGs, AGs and special media gateways) can perform NAT translations on the headers of bearer flow packets; and CSCFs are SIP Application Level Gateways (ALGs), that can translate the IP addresses and port numbers (F-Spec) in the SDP in SIP messages, and can control the NAT translations performed by the gateways they control. As shown in FIG. 1, p-CSCFs control AGs, b-CSCFs control TBGs — media gateways are likely to be controlled by S-CSCFs or a delegate. The CSCF may comprise a computer readable medium comprising a software code embodied therein for controlling the CSCF.

There are two potential approaches to coordinating the alteration of the F-Spec by the CSCF and the setting of NAT mappings in the gateway. In a first approach, the CSCF determines a mapping and pushes it to the gateway which either installs it or returns an error response if the mapping is not feasible (e.g. translation tables are full). Alternatively, the CSCF can request a mapping from the gateway by submitting the original IP address and port, and receiving the completed mapping as a response from the gateway.

In either approach the CSCF alters the F-spec component in the SDP before forwarding the SIP message on to the next CSCF. Note that installing the NAT mapping can be part of a bigger general policy push from CSCF to gateway (e.g. installing QoS policy).

Note that this disclosure does not address the method of choosing which specific TBGs are to form the chain of pinning points (this is part of the SIP routing problem), but just describes the mechanism by which the normal IP routing behavior is altered to ensure that the packets of the bearer flow pass through the chosen TBGs.

The Basic Mechanism

This section discloses a method to realize pinning of bearer flows for a confederation of domains that are all part of the same IP address realm (e.g. a public address domain either IPv4 or IPv6). As described above, the SDP parameters for a bearer flow implicitly include an F-Spec for the bearer flow which identifies the flow by a source and destination IP address, a packet type and source and destination port numbers. Strictly speaking an F-Spec identifies a unidirectional flow, but obviously the F-Spec for the reverse flow can be trivially generated from the original F-Spec so when it is desired to establish a bidirectional flow we will still talk about a single F-Spec. In this first realization all F-Spec IP addresses belong to the same IP address realm.

The essence of the method is that CSCFs on the path of the SIP signaling partition the bearer flow into bearer segments by altering the F-Spec transmitted on to the next CSCF so that the modified F-Spec describes just the bearer segment between gateways controlled by the involved CSCFs. The CSCFs then install in those gateways a bi-directional "cross connect" mapping so that packets in an incoming bearer segment are forwarded by the gateway onto the next bearer segment. In the specific instantiation described here the "cross connect" mapping is a NAT mapping and the forwarding of packets on to the next bearer segment is effected by performing a NAT translation of the addresses and ports in incoming packet headers so as to make them into packets of the next segment of the bearer path, and then forwarding the packets according to normal IP routing procedures.

Figure 4:
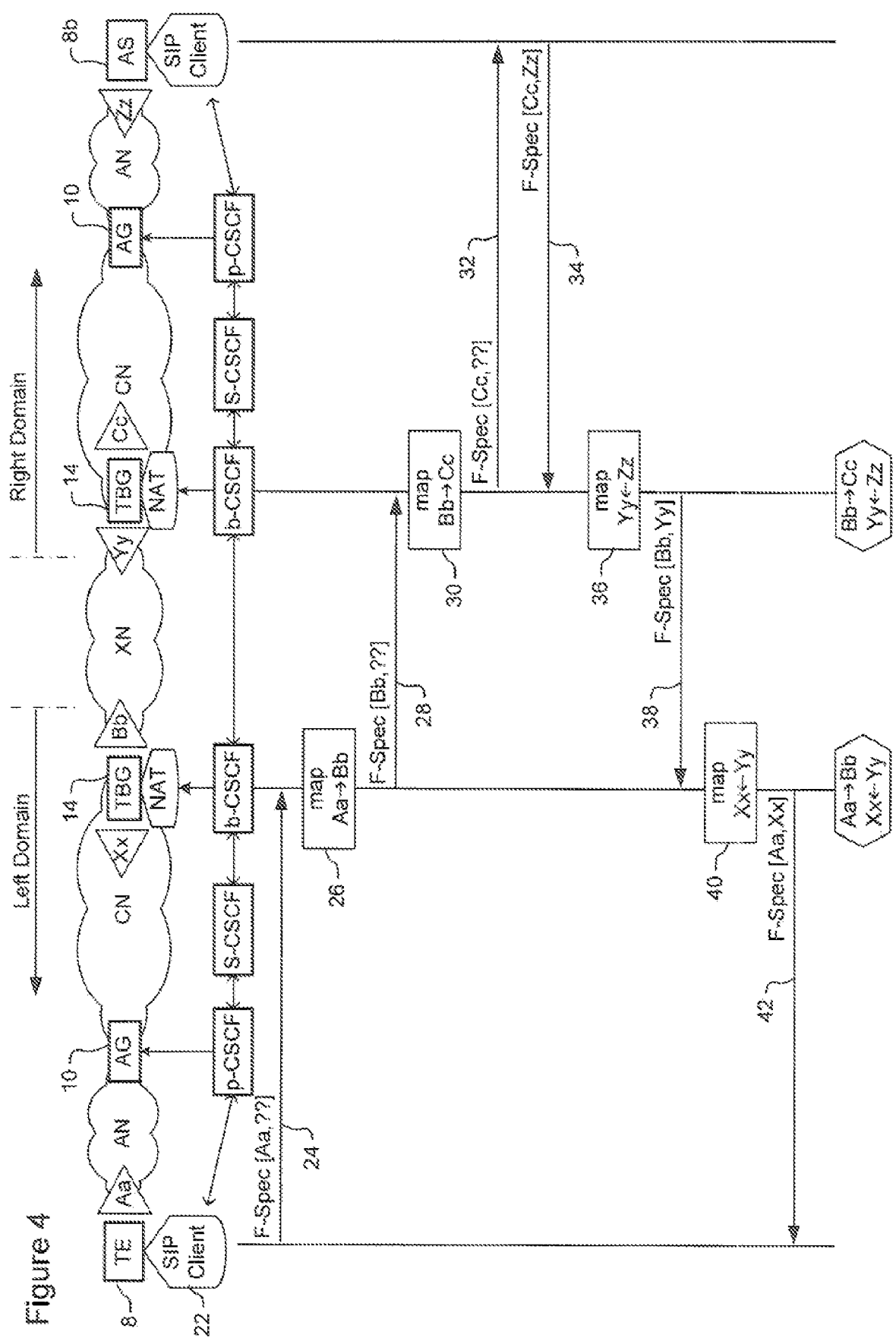
FIG. 4 is a block diagram schematically illustrating use of Network Address Mappings to pin bearer segments in accordance with an aspect of the present invention.

Referring to FIG. 4, the mechanism is first described in more detail for a session initiation involving two domains, shown for rotational convenience as the left domain and the right domain; in PIG. 4 the session initiation is originated in the left domain by a SIP client TE 8 and is to be terminated in the right domain at a SIP client AS 8b, so SIP INVITE messages traverse from left to right and responses such as 200 OK travel right to left. The process to be described applies at every boundary between domains so that when there are more than two domains involved then the left domain is the one closest to the originator (forwards INVITE messages to the right domain) and the right domain is the one closest to the terminator (forwards 200 OK messages to the left domain).

In FIG. 4, in the bearer flow that the session initiation is to set up, the TS end of the bearer flow is specified as originating on/terminating at IP address A and port a, for which we use the terminology Aa. At the start of the SIP session initiation, the address and port number for the AS end of the bearer flow is unknown to the TB 8, thus the F-Spec in the SDP of SIP INVITE message 24 issued by the TB 8 is incomplete and may be represented as [Aa, ??].

When the SIP INVITE message issued by the TE 8 reaches the b-CSCF 16 at the border of the left domain, that b-CSCF chooses a TBG 14 to pin the bearer path through, and requests, or generates, a mapping (at 26) for that TBG to apply to Aa, Assuming the result is the mapping Aa ⇒Bb, the b-CSCF modifies the F-Spec, replacing the TE's originating IP Address and port Aa with the RBG's IP and port Bb, and forwards the INVITE (at 28) to its peer in the right domain. When the INVITE message reaches the peer b-CSCF, that b-CSCF may choose, which TBG 14 at the edge of the right domain will form its end of the exchange bearer segment. (Note that in FIG. 4, unlike the other FIGs, the packet transport between domains is shown as an exchange network XN, rather than just an exchange link—if there is just a single exchange link between pairs of peer TBGs then, choice of a TBG by the left domain b-CSCF would dictate the TBG in the right domain).

The b-CSCF in the right domain requests or generates a mapping (at 30) for the chosen TBG 14 to apply to Bb. Again assuming the result is Bb ⇒Cc, the F-Spec is modified to [Cc,??]. With the session initiation involving just two domains in FIG. 4, the SIP INVITE message will then progress (at 32) through CSCFs in the right domain until it reaches the destination SIP client 22 (shown as an Application Server, AS, in FIG. 4). In more general situations the SIP INVITE is forwarded towards a b-CSCF that peers with the next domain.

From the perspective of the AS 8b, the SIP INVITE it receives is requesting a bearer flow with an end point of Cc.

Assuming the AS replies with a 200 OK message, it will specify its end of the bearer stream (as Zz, for example), so that the F-Spec in the. SDL of the 200 OK message 34 will be [Cc,Zz]. (Those skilled in the art will recognize that the response message that carries the destination F-spec part may be the 180 Ringing message.) The 200 OK message traverses the reverse path of the INVITE, and arrives back at the right domain b-CSCF. That b-CSCF will request or generate another mapping (e.g. Yy ⇐Zz) at 36 and then activate in the TBG 14 the full IP header bi-directional Network Address translation of Bb ⇔Cc, Yy ⇒Zz. Finally the b-CSCF modifies the F-Spec in the 200 OK message to show the bearer flow source address and port as Yy, and the destination as Bb and forwards it (at 38) to its peer in the left domain. At the peer b-CSCF in the left domain, the receipt of the 200 OK message causes the request for, or generation of, the mapping Xx ⇐Yy, the activation in the left domain TBG of the bi-directional mapping Aa ⇔Bb, Xx ⇒Yy (at 40) and finally the propagation towards the originating SIP client of the 200 OK message with an F-Spec of [Aa, Xx] (at 42). From the perspective of the TE SIP client 22, the other end point of the bearer flow for the session is Xx, at the Left Domain TBG 14.

Figure 5:
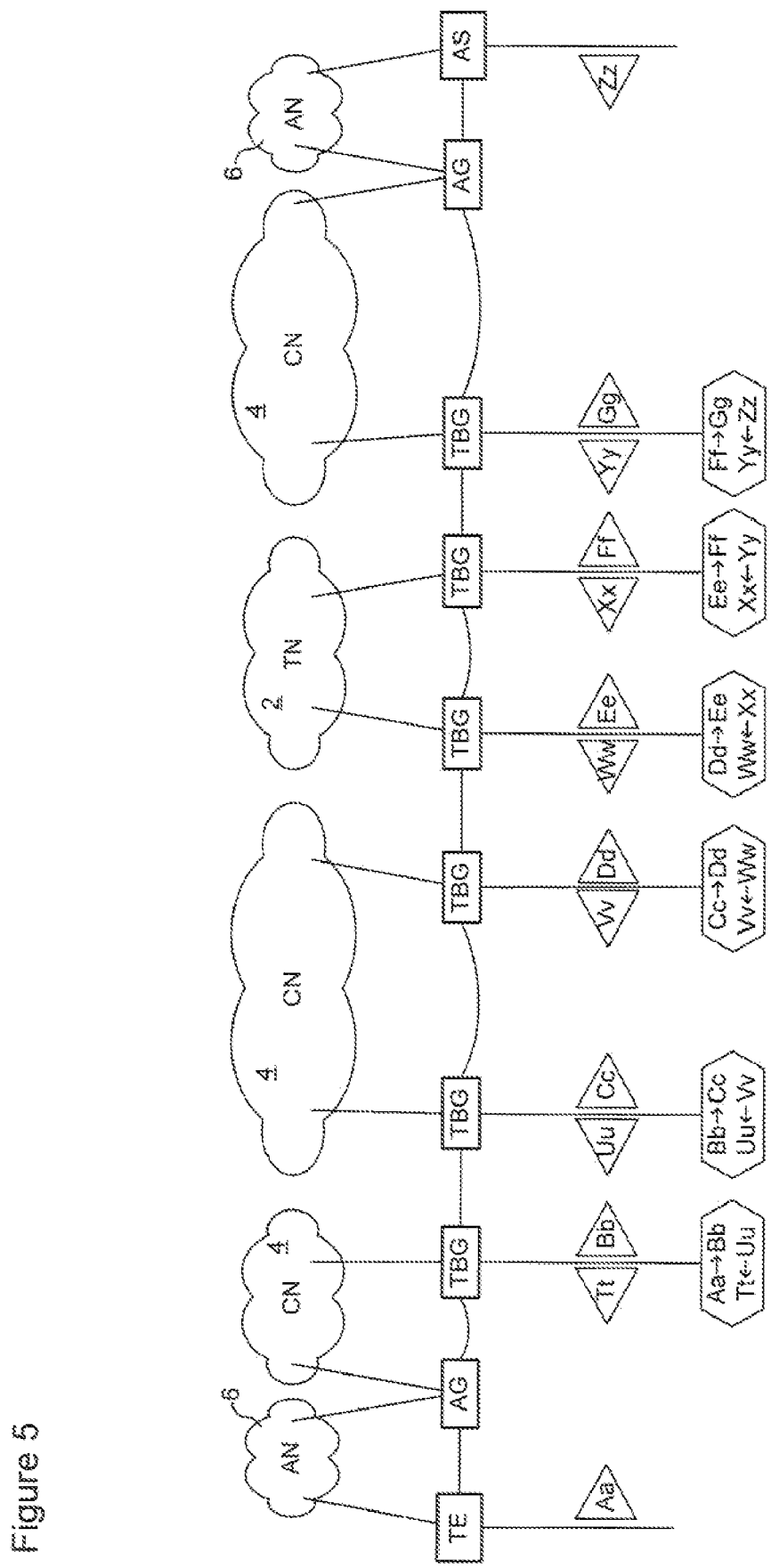
FIG. 5 is a block diagram schematically illustrating use of Network Address Mappings to pin bearer segments in a network comprising multiple bearer segments in accordance with an aspect of the present invention.

What the above disclosed process does, in effect, is to segment the bearer flow into three bearer flow segments and install in TBGs the mappings to "re-label" packets so that they are forwarded onto the next segment. When it sends bearer packets to the AS 8b, the TS 8 puts a destination address of Xx on them, the destination address it received in the 200 OK F-Spec. Xx is an address and port number served by the TBG 14 in the TE's core domain: the first bearer flow segment is between the TS (address A) and the TBG (advertiser of the address X on the left core network), a concatenation of the attachment segment and leftmost core segment of. The second segment is an exchange segment between the left TBG (address B on the exchange network) and the right TBG (address Y on the exchange network). The third segment, again a concatenation of an attachment segment and a core segment, is between the right TBG (advertiser of the address C on the right core network) and the AS (address 2). Packets are forwarded along each individual bearer segment to the end point of the bearer segment according to the normal IP routing rules because the destination address in the packet header is the IP address of the segment end point. At the TBGs the packet header is rewritten to place the packet at the beginning of the next bearer segment. Those familiar with label swapped paths may recognize this as a form of label swapping, where the Label field is the entire IP header source and destination address and port fields. This approach of viewing the present mechanism can be applied to interpret the result of its application when there are multiple domains between originating and terminating domains. FIG. 5 augments FIG. 2 with MAT mappings that define each bearer segment.

It might also be observed that when operating over a single IP address realm that only the destination addresses need to be remapped, as the source address in packets does not affect their routing. However, as the source address is used in various security checks, such as in firewalls, and for installing QoS policies, a consistent approach is needed. When multiple address realms are involved (see below) the source address must be remapped, so we take the approach that it always should be.

Also it should be noted that in the single IP address realm the NAT "label swapping" is only required at nodes where IP forwarding can not be relied upon to forward packets onto the next bearer segment. Bearer flows need only be segmented at gateways that might not always be on the IP forwarding flow path. Generally a contained topology of inter-domain exchange links may enable a guarantee that a gateway will always be on the IP forwarding flow path and hence need not foe a bearer segment end point. As an example, if there is a single pair of TBGs interconnecting two domains and the shortest path between them is guaranteed not to traverse a third domain, then a single bearer segment from TB to AS will suffice to ensure that packets always pass through the pair of TBGs.

Multiple IP Address Realms

Figure 6:
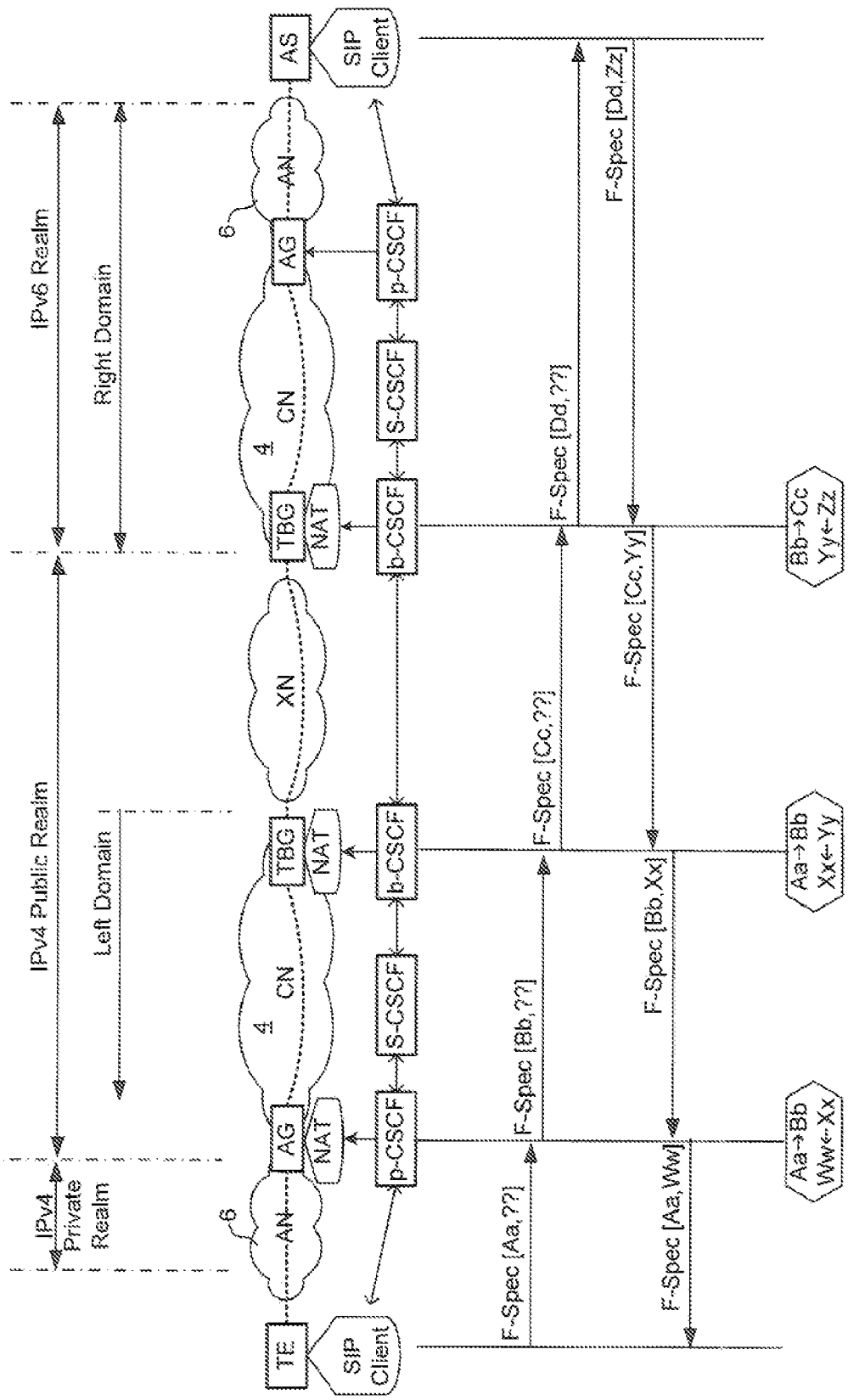
FIG. 6 is a block diagram schematically illustrating use of Network Address Mappings to pin bearer segments in a network comprising multiple IP address realms in accordance with an aspect of the present invention.

The NGN organization described above does not require that every administrative domain be part of the same IP address realm. Rather, because the called party is identified in SIP messages by a URI, not an IP address, the chain of CSCFs can forward SIP messages toward the called party across IP address realm boundaries. This does require that b-CSCFs can adapt SIP signaling to their own IP address realm when they receive it from their peers which are not in the same address realm, for example in FIG. 6 the b-CSCF in the IPv6 realm will receive SIP messages in IPv4 format from its peer in the Public IPv4 realm, and will have to re-format the messages Into IPv6 form before forwarding them on to other CSCFs in its own domain. As noted earlier, SIP messages contain in the SDP part implicit flow specifications (F-Specs) for the bearer flows to be established. When bearer flows are to traverse multiple address realms the F-specs in SIP messages need to be changed at the address realm boundaries to reflect the network address and port translations that will be effected on the bearer flows. Reformatting SIP messages and altering F-Specs is often call the SIP ALG (Application Layer Gateway) Function FIG. 6 depicts two administrative domains using three IP address realms: the administrative domain serving terminals (TEs) assigns private IPv4 addresses for the terminals (perhaps because it does not have enough public IPv4 addresses assigned to it to give every terminal its own public IP address) but uses public addresses in the core network while, the other administrative domain uses public IPv6 addresses throughout. The exchange network inter-connecting the two NGN domains is shown in FIG. 6 as an IPv4 network, part of the public IPv4 address realm. This is an arbitrary choice and the exchange network could equally well have been part of the IPv6 address realm.

Comparing FIG. 4 to FIG. 6 it will be observed that there is an address realm boundary at the left side AG. This AG needs to perform a NAT function on packets as they cross between Attachment Network and Core Network. Thus the p-CSCF controlling the AG, the p-CSCF 16 that peers with the SIP client 22 in the TEs 8 attached to the AG 10, needs to translate the F-Spec in the SDP in SIP messages (so that the bearer flow(s) appear to originate at the AG), and install in the AG the requisite NAT mapping to terminate the attachment bearer segment and originate the core bearer segment. Specifically the address Aa shown in FIG. 6 is a private IP address and port assignment, while Bb is a public IP address (and port number) advertised into the Core Network by the AG 10. Again it will be observed by those familiar with private and public IPv4 routing and default routing, that the Ww ⇐Xx mapping shown is not strictly needed, since private and public IPv4 addresses do not overlap and an attachment network will forward packets to the AG anyway. However not doing a full IP header remap on bearer packets will produce an asymmetry in the forward and backward partitioning of the bearer flow into bearer segments and this could cause subtle maintenance problems.

The other address realm boundary in FIG. 6 is at the right domain TBG. This TBG has one or more interfaces that operate in the IP v4 address realm and specifically the address Y is an IP v4 addresses of (one of) the interface(s). It also has one or more interfaces that operate in the IP v6 address realm, with address D being a TBG IPv6 interface address. As noted earlier, SIP messages arriving at the right domain b-CSCF from the left domain b-CSCF will be in IP v4 format, with IP v4 headers and all v4 embedded IP addresses. The b-CSCF must translate these messages to have IP v6 headers and embedded IP addresses before forwarding the message on to the next CSCF. For the F-Spec in the SDP of SIP INVITE messages the translation has to match the NAT mapping that will be installed in the TBG, that is there is no change from the route pinning procedure disclosed.

Hidden NAT at the Customer Premise

Those aware of the practical deployment issue for public VoIP services will recognize that often there is a NAT function performed between a TE and the attachment network (AN). This function occurs at the border of a residence or enterprise with a private IP address realm. Today this NAT function is not SIP aware (i.e. does not include a SIP Application Layer Gateway (ALG)). However this phenomenon does not materially affect the above mechanism; the same solutions that allow VoIP to work today can continue to be used. Thus, either the client "fixes" the SIP signalling by determining what RAT mapping is being applied by first querying a STUN (Simple Traversal of UDP Through NAT) server, (see RFC 3489); or the p-CSCF detects that a NAT translation has been performed on the SIP signalling from the Client (because the clients IP address embedded in the SDP of the INVITE or reply messages do not match the IP source address in the message header), and instructs the AG to compensate for this when handling the bearer flow.

In the future the residential gateway of customer edge equipment performing the NAT function may be enhanced to include p-CSCF functions or to be controlled by a p-CSCF so that the segment of the bearer flow(s) within the residence is fully under the control of the SIP session establishment process.

Other Benefits of NATting Bearer Flows:

The advantage of the route pinning mechanism disclosed above is that it uses a capability (NAT) that is frequently present in TBGs (and AGs) and it does not require any support from other routers in the core network. The mechanism results in NAT functions being applied to all bearer paths that cross an administrative domain. It also allows for a NAT function to be applied at an AG even when the attachment network is in the same IP address realm as the core network. Below are briefly describe two additional benefits from always NATting bearer flows, that make it the preferred method of route pinning of bearer flows in IMS.

Anonymity

In the PSTN, a caller can request that the called party not be presented with the caller's phone number. SIP signaling supports the suppression of the SIP address of the calling party but the source IP address of bearer packets may be sufficient for the called party to identify the caller or the caller's location. At the very least, having the caller's IP address would enable a called party so inclined to mount a denial of service attack against the caller or perform some other form of Internet harassment. If, as a matter of course, the bearer flow is broken into bearer segments and each party sees only an IP address of their local AG, then making or receiving a SIP call would not reveal to either party the other party's IP address, nor open tip any way of communicating with that party outside of the IMS framework of fully authenticated parties.

Masking Lawful Intercept

It is a requirement of methods of realizing Lawful Intercept that the target of the intercept not be able to detect that her communications are being intercepted. Another constraint on the realization of Lawful Intercept is that operator personal other than those directly charged with performing the intercept not be able to detect that an Intercept is in place—this constraint usually leads to the deployment of purpose specific interception media gateways in the target's home core network. When NAT is used as described above, the SDP description and the actual packet headers of the bearer flows that are presented to an end client do not contain the IP address of the other party but rather that of an intermediate gateway, then the user can not tell (from examining IP addresses) if her bearer path has been diverted to an interception media gateway in order to make a copy of the bearer path packets.

Support for Non-SIP Clients

IMS has been developed under the assumption that the entities at both ends of a session, e.g. client and application server in FIG. 1, use the SIP protocol (speak SIP) in order to be able to set up a bearer flow. The above-described methods extend the applicability of IMS to applications that require QoS treatment for bearer flows that are not necessarily multimedia streams, but the application still needs to be SIP capable. While it is reasonable to assume that an application server has SIP functionality, it is desirable to be able to set up bearer flows to clients that are not SIP speakers. Such a capability will more quickly open up the range of useful services and applications supported by an NGN IMS network than would occur if application clients (which are far more numerous than servers) had to be upgraded to have SIP functionality before the application can exploit the QoS transport provided by the new NGN.

According to a third aspect of the present invention, an application-unaware client proxy is associated with the CSCF that controls the attachment gateway 10 though which a non-SIP client is attached to the network. The client proxy responds to a SIP-INVITE message from the application server, on behalf of the client, so that QoS treatment of bearer flows through at least the attachment segment can be provided. In the embodiment described below, the application server may be a server that is SIP aware and able to invoke the mechanisms described herein. Alternatively, an application server proxy with the required functionality may be deployed instead of upgrading the application server. In either case, the present technique eliminates the need to deploy an application aware specific proxy for all possible application client types (which would be a very difficult procedure in a multi-domain network). The present invention can be implemented by enhancing the p-CSCF that controls the AG that the application client is attached to, to provide a general application independent proxy function for clients.

Below we describe two representative embodiments of the invention: 1) where only the application client end attachment segment of a bearer flow is assured of QoS treatment, and 2) where, the entire bearer flow is to be provided with QoS treatment. The first realization is likely to be very useful for many deployments as, compared to core networks, bandwidth is much more limited in attachment networks, particularly those with a wireless first mile.

Figure 7:
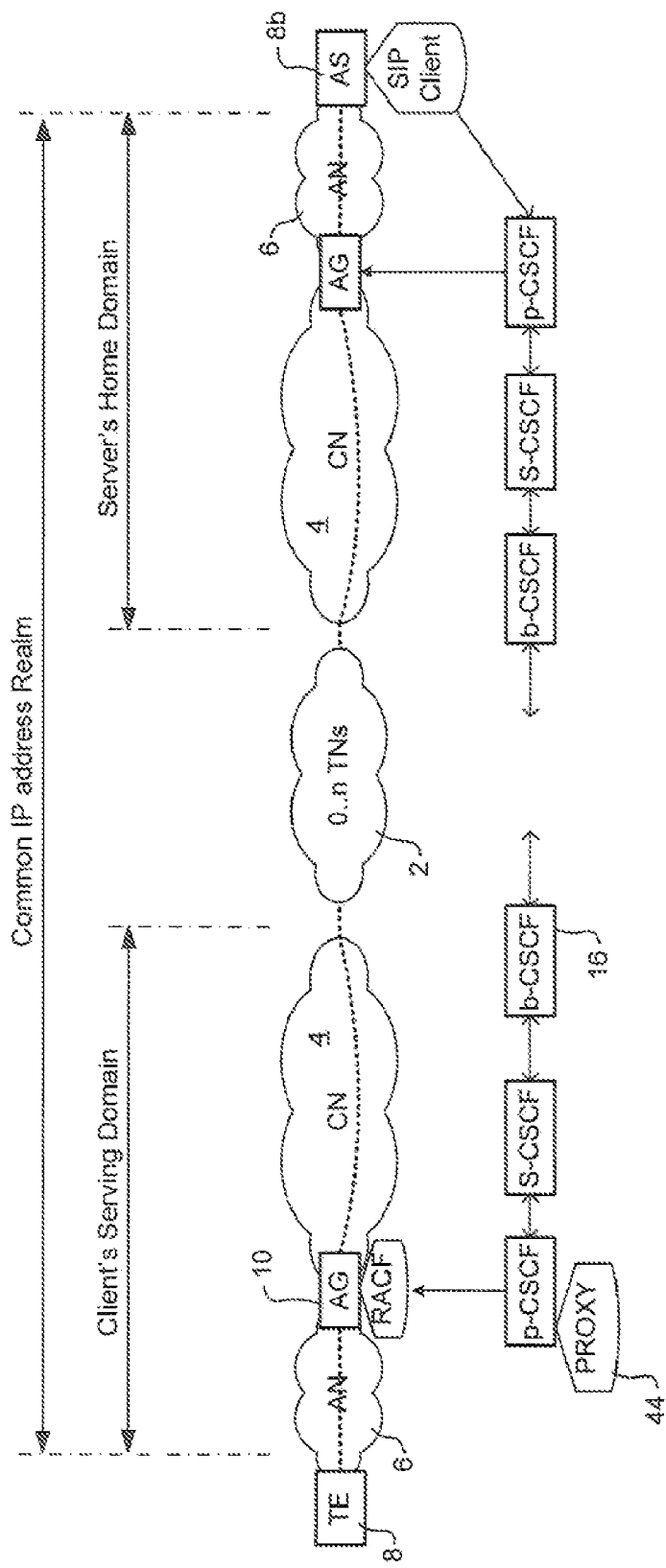
FIG. 7 is a block diagram schematically illustrating a method of supporting a non-SIP client in accordance with an aspect of the present invention.

QoS Treatment for the Client Attachment Bearer Segment:

In this embodiment, the goal is to provide QoS treatment for just the application client's attachment bearer segment (see FIG. 7). It is assumed that the AS 8b (application server or its proxy) is a SIP speaker registered with an S-CSCF in some IMS domain: the Server's home domain. The application client is attached to the core network of some domain (designated as the Client's serving domain in FIG. 7) from which it receives IP connectivity to the NGN network. Since the application client 8 is not SIP aware, it is not registered with any CSCF. However the attachment point of the application client is assumed to be an AG under the control of a p-CSCF in the Client's serving domain. This AG is designated as the Serving Gateway for the TE.

While FIG. 7 shows the Client's serving domain as separated by a transit link from the Servers home domain by zero or more transit domains interconnecting them, the present invention is also applicable to networks in which the application server and client are in the same domain. For the sake of clarity the description below assumes first that the domains (Server's home, Client's serving and any transit domains) are all part of the same IP address realm—additional mechanisms to deal with domains being in separate IP address realms are disclosed at the end of this section.

As the application server 8b is going to send packets (in the bearer flow) to the client 8 it must be able to generate an F-Spec for the bearer flow (otherwise it would not be able to generate the IP header of the packets). Usually there will already have been some interactions between client and server before there is a need to set up a bearer flow: examples are the Internet Key Exchange (IKE) interactions before an IPSec tunnel is set up, or the navigation to select a video clip before it is streamed towards the client. From the IP headers in the initial exchange, the server will obtain the IP address and port number of the client's end of the bearer flow. The client's IP address that the Server learns is an address advertised by the AG 10 through which the client 8 is attached to the core network 4. In effect, the F-Spec describes a bearer segment from Application Server 10 to AG 8b. The AG 10 uses the client IP address in incoming packets to steer them to the attachment bearer segment that completes the flow path to the client 8.

The present invention contemplates a new form of SIP URI (Universal Resource Identifier), which we designate as a Serving Gateway URI, to be used as the INVITE destination parameter (and inserted into the "TO" clause) of the SIP INVITE message generated by the application server 8b. The identifier in this URI is a representation of an IP address: the intended semantics of this URI is that the destination (called party) named by this URI is the p-CSCF 16 that can push policy to the AG 10 that advertises the IP address in the URI.

There are a number of mechanisms that may be used for routing SIP INVITE messages that have this new Serving Gateway URI as their destination. As an example, if b-CSCFs are associated with the AS (autonomous subsystem) that they are in, and that AS number is provisioned in their peer b-CSCFs' forwarding tables, then, when a b-CSCF receives an INVITE message it just needs to determine the "next hop" AS for the BGP-4 route to the target IP address, to identify what new administrative domain and peer b-CSCF to forward the INVITE to. Once the INVITE has reached the destination administrative domain it could be forwarded to a specially designated S-CSCF with which all p-CSCFs in the domain had registered the address ranges of the gateways they control. This designated S-CSCF then matches the Serving Gateway URI to address ranges to determine the p-CSCF to which to forward the INVITE message. Other forwarding methods may also be used, as desired.

Under the assumptions above, the establishment of a bearer flow between an application server and a client proceeds as follows;

At a first step, the application sever 8b sends to its S-CSCF, in its Home domain (via its p-CSCF), a SIP INVITE with the TO clause containing a Serving Gateway URI specifying the client's IP address and including, in the SDP part, the F-spec for the bearer flow to the client and a T-spec that the server wants applied. (Since it is the server that will he billed for the session it is the server's prerogative to specify the T-Spec).

Once the S-CSCF has performed the normal origination processing on the INVITE, it forwards the INVITE towards the client's serving domain. If the client's serving domain is distinct from the server's Home domain then the INVITE will be forwarded via b-CSCF's, potentially crossing several domain boundaries until it arrives at a b-CSCF at a border of the client's serving domain, for example using the forwarding decision process outlined above.

Once the INVITE arrives at a b-CSCF in the clients serving domain, it has to be forwarded to the p-CSCF that controls (invokes the policy decision function of) the AG 10 that the client 8 is actually attached to. Again the example mechanism outline above may be used, but those skilled in the art will recognize there are multiple mechanisms possible.

Other Benefits of NATing Bearer Flows:

Upon receipt of the INVITE message, the p-CSCF requests (the RACF of) the AG 10 to install a QoS policy in the attachment network that conforms to the T-Spec specified for the bearer flow identified by the F-Spec in the SDP of the INVITE message. It is at this point that the modified behavior of the p-CSCF kicks in, triggered by the TO clause containing a Serving Gateway URI and the results of the attempt to install the QoS policy. In a conventional system, the p-CSCF would forward the invite to the client 8, which in the present case (the client is a non-SIP client) would not know what to do with it. Thus, in accordance with the present invention, a generic proxy 44 instantiated for the client 8 (or, equivalently, the p-CSCF acting in the capacity of a generic proxy) sends an appropriate SIP reply back to the Application server 8b on behalf of the client 8. If the attempt to install the QoS policy on the AG was successful, the generic proxy sends an accept (e.g. a "200 OK") message back to the Application server 8b along the reverse path of the INVITE. Alternatively, if the QoS policy install request failed, then the return message from the generic proxy 44 would be a BYE message instead, to indicate to the server 8b that there was were insufficient resources in the attachment network to support the requested T-Spec for the bearer flow. It will be noted that, in this operation, the QoS treatment is applied to the attachment bearer segment, and the SIP signalling generated to complete set-up of the bearer flow, without the b-CSCF (or generic proxy 44) having any awareness of the client application. As such, the generic proxy 44 is truly generic, it can be used to set up bearer flows with QoS treatment, for any client application.

Onces the Application server 8b has completed the SIP session set-up, packets that it sends to the client 8 that conform to the F-Spec will traverse the various intermediate domains in the usual best effort fashion, but will traverse the access/attachment network 6 with the specified QoS.

When the Application Server 8b has finished serving the client 8, it can release the QoS resources by sending a SIP BYE message along the path of the original INVITE. When it reaches the p-CSCF, the BYE message will cause the release of the QoS policy for the bearer flow in the normal fashion, but again it will be the p-CSCF (or generic proxy 44), rather than the client application itself, that generates the SIP acknowledgement messaging.

Note that the above disclosed mechanism will not work with unmodified application clients when QoS policy in an attachment network is installed by a so called "pull" mechanism, since "pull" mechanisms require that the client be involved in the process, and the essence of the described method is to install a QoS policy in the attachment network without the involvement of the client.

Dealing with NAT: Multiple IP Address Realms

As described above, there are two cases to deal with when of the TE 8 and AS 8*b* are indifferent IP address realms. The first of these is when the TE 88 is in a private IP address realm and the core networks are part of a single public IP address realm. The AG 8*b* performs a NAT function translating IP headers on packets going into the core network 4 so that the source address in packets from the client 8 is a public address advertised by the AG 10 when the packets reach the Application Server 8*b*. Provided the Application Server 8*b* uses this public address in building the Serving Gateway URI and F-Spec (and not an un-translated address inside a control packet) then the INVITE message will arrive at the controlling p-CSCF as described above. The p-CSCF makes its RACF request using the public IP address realm F-spec: the AG 10, aware that it is NATing traffic from the client 8, needs to map the client IP address in the F-spec before installing any IP layer "gates" in the attachment network).

Figure 8:
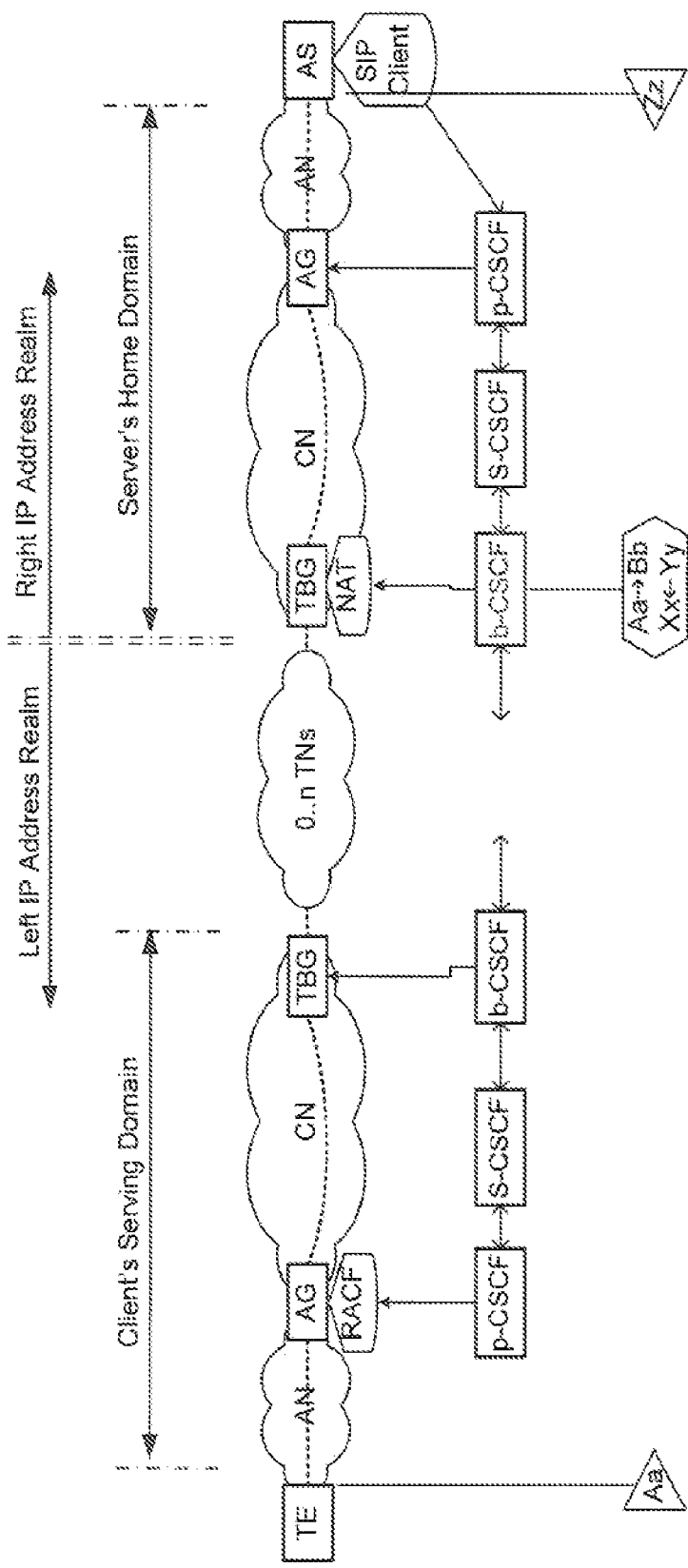
FIG. 8 is a block diagram schematically illustrating a method of supporting a non-SIP client in a network comprising multiple IP address realms in accordance with an aspect of the present invention.

When there is an IP address realm boundary between core networks 14, things get a little trickier: the bearer flow path is in effect segmented into two parts at the TBG 14 that, performs the inter address realm NAT. In FIG. 8, the border between the Left IP address realm and the Right IP address realm is shown to be at the edge of the Server's home domain (although it could be at the border of any of the domains) and the TBG 14 there is the one that performs NAT on all traffic. From the perspective of the Application Server 8*b* generating a Serving Gateway URI, that TBG 14 is the Serving Gateway (i.e. that advertiser of the source address in packets arriving from the TE client, in FIG. 8 the Application Server sees a source address of B which is an address in the Right IP address realm).

A SIP INVITE message can be routed to the b-CSCF that controls the NAT TBG 14 using, for example, the same mechanism described above. As noted above, b-CSCFs that control address realm boundary TBGs have to be able to perform, a SIP ALG function. In this case the NAT mapping for the F-Spec of interest will already have been installed in the NAT TBG before the SIP INVITE message arrives at the controlling gateway. The first action of the b-CSCF has to be to poll the TBG 14 for the NAT mapping so that it can then construct the INVITE message for the client side (Left) IP address realm, with a Serving Gateway URI for the AG 10 the TE 8 is attached to and an F-Spec for the client side bearer segment. In FIG. 8 the new Serving Gateway URI would contain address A. From this point on the process proceeds as described above, with the b-CSCF performing the required ALG functions on the reply SIP messages.

There is one caveat when dealing with IP address realm boundaries between core networks. As noted above, the routed IP path for a bearer flow may not traverse the same domains as SIP signaling. In particular there may be networks where a routed IP path may go though domains that are not participants in the NGN. If the NAT translation occurs at a border gateway that is not part of the NGN (i.e. is not under the control of a b-CSCF) then the above mechanism will fail. The work around for this situation is to use full route pinning as described in the next part.

Example

A typical example of the use of this invention would be for a legacy (i.e. pre SIP) streaming video service. A video service provider may wish to deliver streaming video at a quality level that is greater than most access/attachment networks can reliably support at the "best effort" level of service. Once this invention is deployed in the NGN, the Video Service Provider would upgrade his servers to be SIP capable (including being able to generate Serving Gateway URIs) and then negotiate IMS service from a local operator. The local operator will set a tariff, which may be per movie, or time based, or per megabyte transferred at a specific QoS class. This form of the tariff will depend on competitive factors, and will probably be lower for sessions that remain "on-net" (the client is attached to the operators own network) than for sessions where the operator has to share the fee with one or more other operators. The tariff may also be specific to the type of attachment network the application client is using, being higher for wireless than wireline. The SLA between the Video Service Provider and NGN operator would also cover the issue of refunds when there was a failure in a session.

Potential clients of the video service proceed as usual, interacting with the Video application server(s) to browse and select a movie. As part of the browsing response displays, the price for viewing the movie will be presented to the user: presumably the Video Service provider will set the price so as to cover the cost of the delivery tariff. Perhaps the movie will come with different resolutions, at different prices, suitable for different client attachment networks. Once the user selection is complete the Video server initiates a SIP session with the TO clause of the INVITE containing a Serving Gateway URI with the client's IF address and a T-Spec for the video stream. This will result in the AG that is serving the client installing a QoS policy in the attachment network the client is currently using, so that the video content packets destined to the client from the server receive the QoS treatment the video server requested in the INVITE message.

End to End QoS Treatment for the Bearer Flow

As described above, the NGN network can provide QoS treatment to all segments of the bearer flow, with the bearer flow being "pinned" though TBGs of the administrative domains that participated in the SIP signaling exchange. This mechanism and the resulting End to End QoS capability can be combined with the use of Server Gateway URIs when TE clients are not SIP speakers. Compared to the mechanism for delivering QoS just on the client attachment segment, the combined mechanism has each p- and b-CSCF (that processes the Server's INVITE message as it is routed to the p-CSCF controlling the TE's Serving Gateway) also prime gateways to do the NAT translations to pin the bearer flow so that it receives the requested QoS treatment.

In addition to the conditions and assumptions needed for QoS on the attachment segment there is one extra proviso needed to deliver end to end QoS: when sending packets that are part of the bearer flow the application server must use the destination address and port number derived from the final F-Spec received in the SIP reply "200 OK" message, rather than the original client address and port number it learnt from the legacy protocol (which it put in the original F-Spec).

Because the final F-Spec generated by CSCFs defines the attachment bearer segment for the Application Server using its addresses in the packet headers ensures that: even when the application server has multiple network attachment links in place, the application server will forward the bearer packets towards the AG that has been "primed" by the SIP signaling to deliver QoS and map packet headers so as to forward the packet onto the next bearer segment; and, when there is more than one IP address realm to traverse, the route pinning operation results in using the NAT gateways that have their NAT mappings set by controlling b-CSCFs.

Benefits:

The benefit of the present methods can be seen from the above example of a legacy Video Streaming Service. Without the present invention being in place, the only way for a video service provider to ensure QoS to a legacy (i.e. non-SIP) client would be for the video service provider to enter into a special relationship with every attachment network provider that his subscribers use, so that all traffic from his video servers is accorded enhanced QoS over those attachment networks. This has the drawback that either the service is going to be limited in geographical scope or the video service provider has to negotiate with every attachment network provider that any of his customers might want to use. With the present invention, the video service provider needs only negotiate with one operator that is part of the NGN and can then serve subscribers attached to any NGN operator's network. Then there is also the issue of statically reserving resources in the access network for which the access network provider might reasonably want to be paid whether or not the video service provider used them. This would probably lead to the Video Service provider being conservative in the capacity/number of video sessions he would reserve on each attachment network; the video server would have to run its own RAC against these reserved/pre-allocated resources to ensure that the SLA traffic levels were not breached.

Those familiar with SIP operation will recognize that there are other benefits to being able to use SIP to set up a bearer path even when one end is not SIP aware. For example it may happen that during the course of a session the attachment network can no longer support the T-Spec that agreed to at session initiation—for example a mobile terminal may have moved further from a base station and the available transmission rate between the two has been reduced. In the proper operation of a RACS subsystem, the controlling p-CSCF will be informed that the QoS policy that it pushed can no longer be met. It can then initiate a re-invite SIP signaling sequence back to the Originator, including sending back a T-Spec that reflects the current attachment link characteristics. It is then an application decision whether to re-establish the session at the lower QoS, or to terminate it.

Gateways for Legacy IP Signalling

Figure 9:
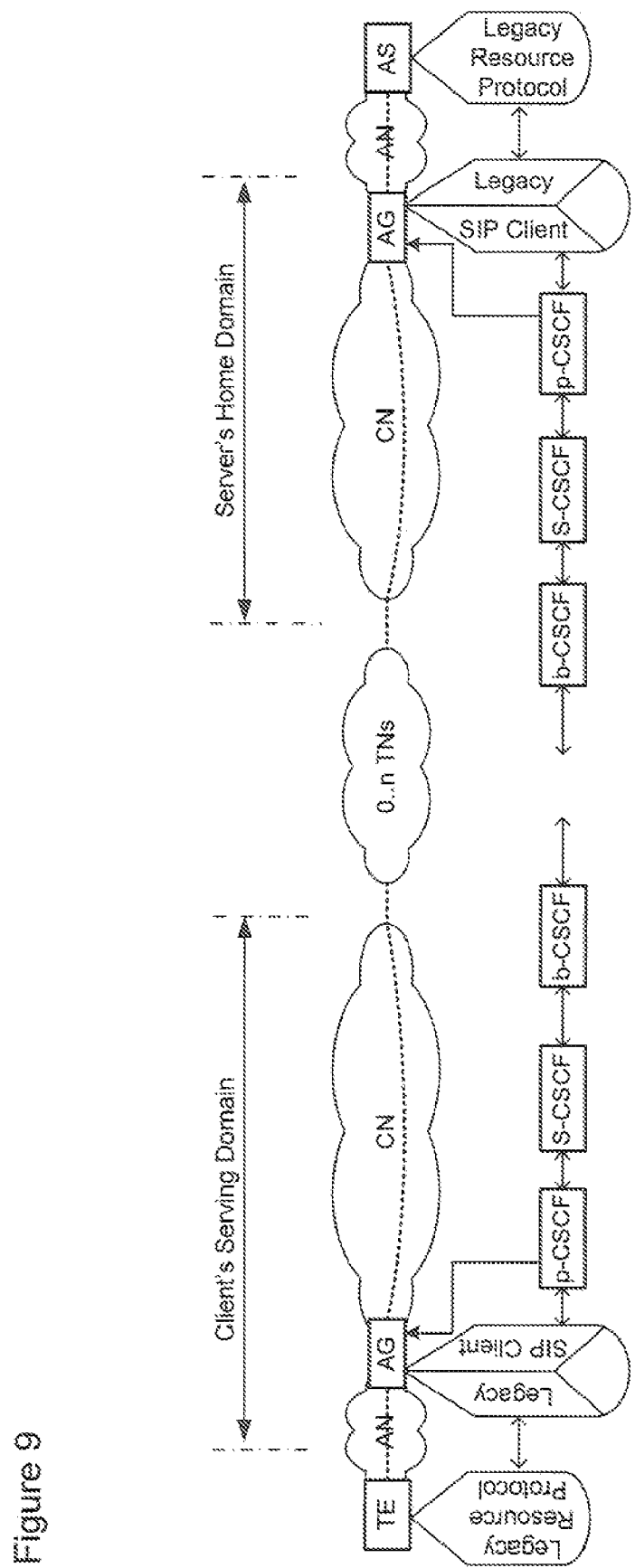
FIG. 9 is a block diagram schematically illustrating a method of interworking with legacy protocols in accordance with an aspect of the present invention.

It was stated above that the alternative to the disclosed methods of delivering QoS to non SIP speaking applications over the NGN, was to develop application specific SIP speaking proxies for clients and servers. The problem with this solution is the wide range of potential applications that would have to be catered for. However some applications may already use some form of resource reservation protocol (legacy IP signaling), and the number of these protocols is very limited. Probably the only two that need to be considered are (RTSP) [H. Schulzrinne et al. "Real Time Streaming Protocol (RTSP)", RFC 2326, April 1998] and RSVP [R. Braden (ed.) et al. "Resource ReSerVation Protocol (RSVP)", RFC 2205, September 1997]. A fourth aspect of the present invention provides a gateway device that provides legacy IP signaling to SIP signaling inter-working. Thus, an inter-working gateway can be provided which hosts a signalling inter-working function (SIWF) that terminates the RTSP and/or RSVP signaling at the edge of the network and generates SIP messages across the core network to establish (QoS enabled) end to end bearer paths FIG. 9 is a depiction of the deployment of the inter-working gateways. In this figure the signalling inter-working function (SIWF) is shown as being hosted on the serving AGs for both of the application entities (Client on TE and Server on AS) to be interconnected with a bearer flow. AGs, being always in the path of packets to and from end systems, are preferred choices for hosting the signaling inter-working function, since, using deep packet inspection, they can detect the inband legacy signaling packets ("inband" means that the signaling packets are mixed in with, other traffic). However AGs are not the only possible choice. Another likely realization would restrict the AG's role to detecting signaling packets and forwarding them, in some form of tunnel, to the signaling inter-working function co-located on the same platform as the AG's controlling p-CSCF.

The operation of SIWFs can be briefly summarized as follows:

Each SIWF establishes an association with a p-CSCF and registers itself as the SIP client for the end systems it serves. As in the case of Serving Gateways (invention 3), the client addresses registered may be just the IP addresses advertised by the AG for end systems that are attached to it. Alternatively, and more in keeping with commercial considerations. Application Servers may have names assigned by an administrative procedure when authorized by a carrier to use the SIWF functionality to set up QoS enabled bearer paths across an NGN network When it detects a legacy signaling message that is a request to set up a bearer flow originating from an end system that it serves, a SIWF extracts from the message both an F-Spec and a T-Spec for the bearer flow, and constructs a SIP INVITE message addressed to the same entity the legacy message was addressed to. However instead the scheme part of the INVITE request URI being "sip:" the name of the legacy signaling protocol may be used as the first part of the URI, to indicate to the destination that the INVITE message actually came from a SIWF. Also the original IP legacy signalling: message may be carried as a field the SIP message body, in the same manner that ISUP messages are carried in SIP-I (also called SIP-T).

The NGN network forwards the SIP INVITE message towards the SIWF that registered the name its destination URI (assuming that the destination is attached to the NGN through an AG that support a SIWF function that registered its name or IP address). When the INVITE message arrives at the SIWF that registered the destination that SIWF reconstitutes the legacy signaling message (either directly from an encapsulated version of the message carried in the INVITE, or by reversing the process that generated the F-Spec and T-Spec in the INVITE). The reconstituted legacy message is then forwarded to the destination entity. In one realization of the invention the SIWF will leave the apparent source of the legacy message as the actual originating entity, but in other realizations, particularly those where the originating and destination entities are in different address realms, the SIWF will appear as the originator of the legacy signaling message. (This latter approach makes it easy for the SIWF to receive the legacy signaling reply, since it will be directed to it, but since it is a form of NAT without ALG it may also cause applications to break)

In due course the destination entity will generate a legacy protocol response. This will be captured by the serving AG and directed to the SIWF. The SIWF will match the response to the reconstituted original message and to the original INVITE. The SIWF converts the legacy response to a SIP response (e.g. 200 O.K.) and forwards if on the return signaling path to the SIWF that serves the originator. Some of the SDP fields in the SIP response may be extracted from fields in the legacy response while others will be from the SDP conveyed in the INVITE. Based upon the F-Spec and T-Spec in the SDP the CSCFs on the signaling path will reserve the resources for the bearer path.

When the SIP response reaches the SIWF serving the originator it again reconstitutes the legacy response message and forwards it on to the actual originator.

As RSVP and RTSP are quite different protocols the more detailed disclosure of the SIWF procedures is provided separately for each protocol.

RSVP

Present Mode of Operation:

The RSVP protocol is intended for reserving resources in a network to support uni-directional bearer flow (called simply "data flows" in the RSVP RFCs). While RSVP can be used to reserve resources for multicast flows and general, any to any, conferencing sessions, the present description is limited to its use for unicast or point to point bearer flows between just two entities, such as the AS and TE in FIG. 9. Under the RSVP mode of operation the source of the flow initiates the reservation process with a "path" message, containing a form of F-Spec (called filterspee) and a T-Spec. For unicast bearer flows, the F-Spec is a complete tuple of source and destination IP addresses and port numbers (and protocol), called a fixed filter, which means that the destination IP address and port number needs to be known by the source before it sends out the "path" message.

The "path" message is addressed to the intended receiver of the bearer flow and so follows the IP routed path between sender and receiver. In the simple unicast case the main effect of the "path" message is to record in the traversed RSVP capable routers the previous hop address so that the return message, the "resv" message, can traverse the same path back from the receiver to the sender. The receiver replies with a "resv" message which follows, in reverse, the hop by hop path of the "path" message. As it processes the "resv" message, each RSVP capable router commits network resources for the bearer flow based upon the T-Spec (called somewhat confusingly the flowspec) in the "resv" message.

Using RSVP to SIP SIWF Gateways

Figure 10:
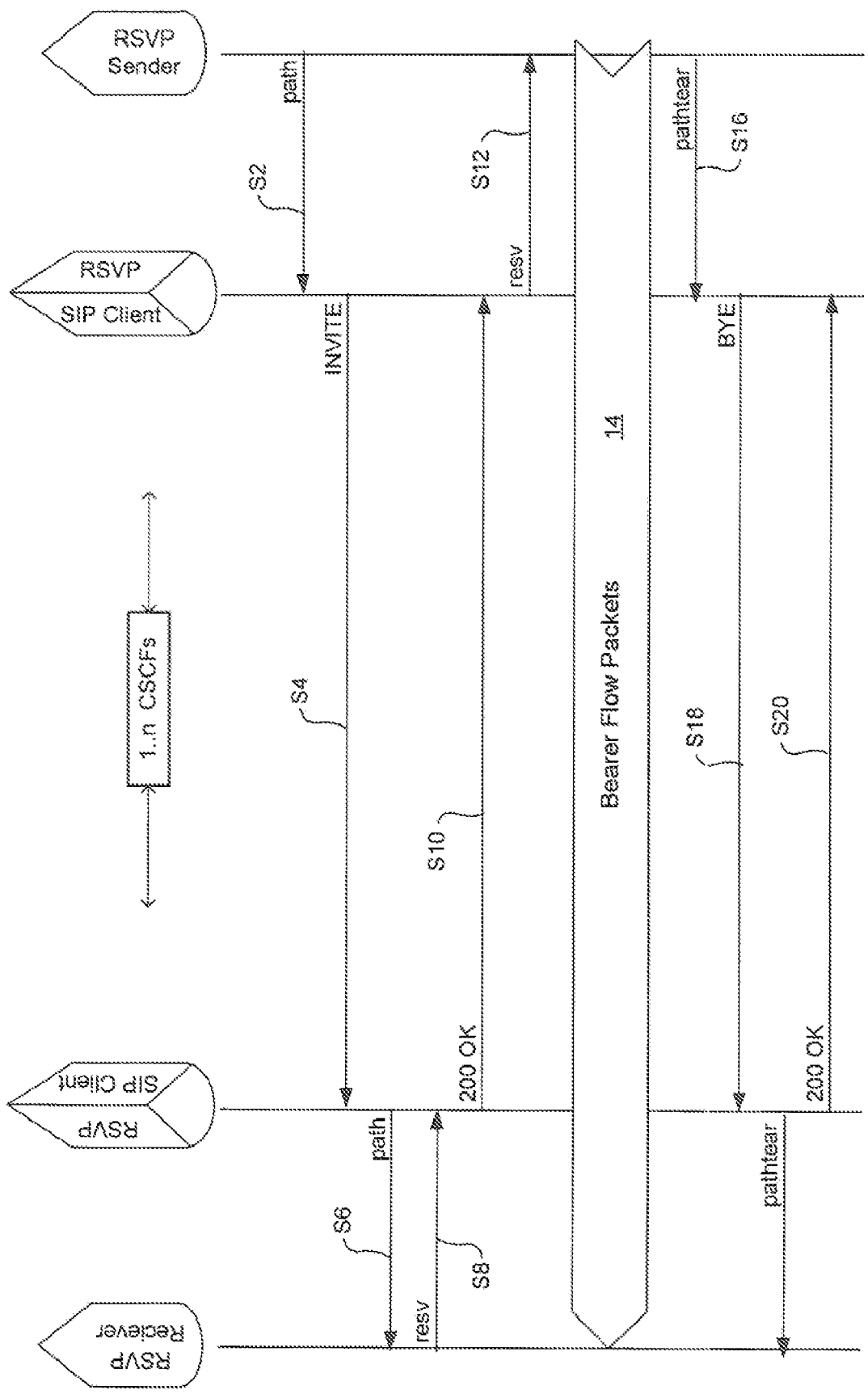
FIG. 10 is a message flow diagram schematically illustrating a method of RSVP to SIP interworking in accordance with an aspect of the present invention.

FIG. 10 is an outline message sequence chart, showing the signaling inter-working in the establishment of a bearer flow from an application server (AS) to a client terminal equipment (TE), across the NGN, with both AS and TE using RSVP to request that the network provide QoS for the bearer flow. SIWF functions are located at the first IP hop from both AS and TE, which in terms of the NGN architecture described in FIG. 1, implies that SIWF functionality is hosted on attachment gateways (AGs). (As noted above, this first hop may be extended by having the AG recognize and tunnel the RSVP signaling messages to a SIWF function hosted further in the network for example on the same platform as hosts the p-CSCF that controls the AG).

It is assumed that the application that the AS provides to the TE is initiated by an exchange of messages between them. At some point (e.g. a movie has been selected and payment details sorted out) the AS determines that it needs to deliver a packet flow (bearer flow) to the TE and constructs a "path" message specifying the source and destination IP addresses and port numbers (F-Spec) of the flow and the T-Spec for the flow. It addresses this message to the TE and sends it off at S2.

The "path" message is intercepted by the SIWF and converted to a SIP INVITE message S4. The F-Spec and T-Spec of the bearer flow are converted into SDP parameters (using invention 1 for the T-Spec) and, given that the TE is identified by an IP address, the SIP destination URI will be a Serving Gateway URI (as described above). In addition to translating the F-Spec and T-Spec from the RSVP format to the SIP format it is possible that the original RSVP message could be appended to the SIP message. In one embodiment of the SIWF mechanisms the entire RSVP "path" message could be encapsulated and carried as an opaque field in the INVITE message. In another embodiment only the internal fields of the "path" message and not its header would be carried in the INVITE message. Also as noted above an embodiment of the invention may choose to change the "scheme" of the URI resulting in a first line of the INVITE message something like:

INVITE rsvp:xxx.xxx.xxx.xxx SIP/2.y where xxx.xxx.xxx.xxx is an IP (v4) address.

The NGN network will forward the SIP INVITE message to the p-CSCF serving the AG serving the TE, in the manner described above. From the registration function that the SIWF had performed registering the IP addresses (or address range) for which it is able to perform its inter-working functions, the p-CSCF will be able. In embodiments where the scheme in the URI is changed that will suffice to alter the p-CSCF to forward the INVITE to a serving SIWF.

The SIWF then regenerates from the INVITE message an RSVP "path" message, using encapsulated (parts of) the original path message if they were included, and adds its own IP address into the message as the "previous hop". It forwards the "path" message on to the TE 8 (at 86). The TE 8 will respond with a "resv" message S8 addressed to node that hosts the SIWF function (its previous hop). The SIWF function will match up the "resp" message (S8) with state it installed on receiving the INVITE message and from that it will generate the response to the INVITE e.g. a 200 OK message S10. Since the rules of RSVP permit the TE to change the T-Spec parameters in the "resp" to different values that it received in the "path" message, the SIWF will have to regenerate the T-Spec part of the SDP for the response, rather than just echoing back the same values it received in the invite. The 200 OK message is carried back across the NGN to the SIWF serving the AS, the CSCFs in the message's path pushing the appropriate policies to gateways so that the bearer flow described by the F-Spec in the SDP will receive the QoS treatment specified by the T-Spec in the SDP. After the SIWF has regenerated the "resv" message S12 and forwarded it to the AS, the AS can start sending the bearer flow packets 814.

RSVP is a soft state protocol while SIP is hard state. This means that the Sender (AS in FIG. 10) and Receiver (TE in FIG. 10) periodically issue "path" and "resv" messages respectively to "refresh" the network resource reservations for the bearer path. RSVP enabled routers will release resources if they do not see these "refresh" messages within a "cleanup timeout" interval. Obviously SIWF functions should only convert new RSVP messages into SIP messages and just use "refresh" messages to reset timers. If a "refresh" message is not received for a sufficiently long interval then a SIWF should issue a SIP BYE message to tear down the session. Also while the SIP session is in place the SIWFs have to generate the matching refresh messages so that the Sender and Receiver do not think that the bearer path has lost its reservations.

As well as resource reservations being allowed to lapse, RSVP does provide for explicit tear down. In FIG. 10 the Sender is depicted as terminating the bearer path as the end of the session with the receiver by issuing a "pathtear" message S16. When a SIWF receives a "pathtear" (or a "resvtear") message from a RSVP Sender (or a Receiver) is issues a SIP BYE message S18. BYE messages are acknowledged (with a 200 OK response S20), while RSVP "tear" messages are not acknowledged.

Those skilled in the art will recognize that it is not a requirement that the TE and AS be one IP hop away from their serving SIWFs. In particular the AS and/or TE could be connected to RSVP supporting networks (e.g. enterprise networks with RSVP enabled routers) and the SIWF function at the border of the NGN could be several IP hops removed.

RTSP

RTSP is, like SIP, a text based application protocol. And, like SIP, it uses SDP to describe media streams. There is considerable overlap in semantics. However, being an earlier development than SIP it is targeted at a subset of the applications that SIP supports. The main application area of RTSP is multimedia presentations, both stored and live. Live webcasts, and their subsequent playback from storage are a one user of RTSP, Internet streaming of audio ox* video is the other use. The semantics of the RTSP messages do not match directly to SIP. One type of message, the DESCRIBE response message, carries the SDP that describes a presentation of potentially several bearer flows (and from which the T-Spec for each flow has to be deduced), while another type of message, the SETUP message carries the F-Spec for one bearer flow. A separate SETUP message is required for each bearer flow. To make matters worse RSTP does not require the use of DESCRIBE messages: an application client can learn the media initialization parameters for a bearer flow though any technique.

It must be recognized then that it would be difficult to produce an efficient SIP-RTSP SIWF to handle all possible uses of RTSP. Since in fact a very small number of RTSP media servers and players (i.e. REAL, Quicktime, Windows) dominate the uses of RTSP on the Internet, a SIWF that designed to cope with their RTSP usage patterns will be the most beneficial. The following describes an embodiment of the invention targeted at applications that establish a bearer flows in a session after having exchanged DESCRIBE messages.

Using RTSP to SIP SIWF Gateways

Figure 11:
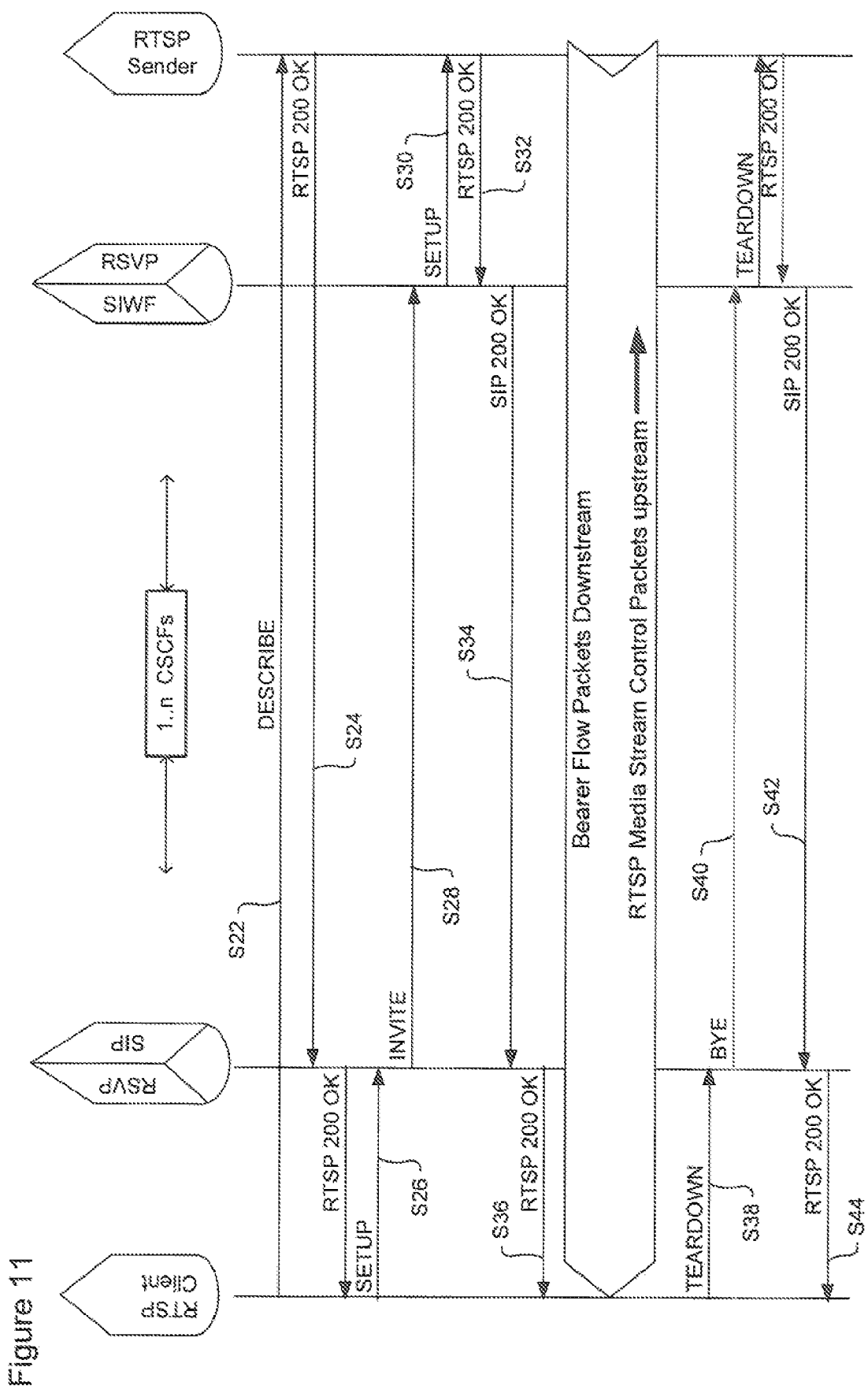
FIG. 11 is a message flow diagram schematically illustrating a method of RTSP to SIP interworking in accordance with an aspect of the present invention.

FIG. 11 depicts the message flow for an RSTP client or player (hosted on a TE) requesting a media stream from an RSTP speaking Application Server (AS) across an NGN that has at its edges RTSP to SIP SIWF functions intercepting RTSP messages from TE and AS.

An RTSP client that wants to initiate a RSTP session will know the URL of the application server, so it can generate the request-URI for a DESCRIBE request message and send that message (at S22)) to the server. In FIG. 11 the DESCRIBE request message is shown as passing straight through the nodes that host the SIWF functions. Only the response RTSP 200 OK (S 24) is of interest to them, and in fact only the SIWF serving the client needs to cache the SDP body part of the response to the DESCRIBE. It should be noted that the Application server that describes the media streams of the session need not be the same entity that serves up the media streams, hence there would be no guarantee that the SIWF serving the application server would be the same one serving the media servers.

The client's SIWF (i.e. the SIWF hosted at the AC that the TE is attached to) needs to be able to detect RTSP 200 OK messages in the stream of messages directed to the client. In particular it needs to detect and cache the description of the media streams carried in the message body. In fact SIWF could be designated to examine all forms of 200 OK messages for a "Content-Type: application/sdp" line and cache the body contents against possible future RTSP SETUP requests from the client. In particular this would cover the case where the SDP parameters for the session were conveyed using an HTTP response.

The SDP parameters received by the client describe one or more media stream sources that constitute the session. Included for each source is its URI. Thus the client issues SETUP requests to each media stream source with the request-URI it learnt from the DESCRIBE response (FIG. 11 shows one SETUP request being issued for a media source that is the AS). Included in the SETUP message is the port number that the client wants to receive the bearer flow (Those skilled in the art will recognize that with rtp/avp profile bearer flows it is actually a pair of port numbers chat is specified but that the second of these is for RTSP traffic which is unlikely to benefit from better than "best effort" QoS treatment).

When the client's SIWF recognizes a SETUP request S26 it first has to match it to a media stream description in the cached SDP of a prior DESCRIBE response. It has two keys to do this: the client's IP address, in the packet header source field of the SETUP message and the destination field of the DESCRIBE response, and the request URI of the SETUP message which should match the media stream source URI from the SDP of the DECSRIBE response. (Just matching the media stream source URI would usually suffice, but there may be circumstances where different clients get served different encodings, and so it is safer to match clients as well). When a match is found the SIWF is able to construct the T-Spec part of the SDP for a SIP INVITE message S28. The receiver end of the F-Spec (i.e. the packet type, and Client IP address and port number is also encoded into the SDP. Since there is a request URI in the SETUP message there are two choices for request/destination URI in the INVITE message, namely: if the media server has been administratively registered with a distinctive URI (i.e. one that the SIWF can recognize as being rentable to by SIP) and has returned that URI as part of the DESCRIBE response, then this URI, copied from the SETUP message, can be used as the request URI for the INVITE; otherwise, the destination IP address of the SETUP message can be used to construct a Serving Gateway URI (as described above and similar to the case for RSVP above).

The INVITE message is forwarded by the NGN in the previously described fashion towards the server and arrives at the server's SIWF (i.e. the SIWF associated with the AG that the server is attached to). Assuming that policy checks are satisfied (see below), the SIWF regenerates the SETUP request S30 and forwards it to the media server. Again, as in the case of RSVP, an embodiment of the invention may actually transport a copy of the SETUP message encapsulated in the INVITE message, but the information in the INVITE message, exclusive of this, will suffice to enable the generation of a semantically identical SETUP message to that sent by the client.

The Server, when it issues its response S32 to the SETUP message, includes in it the source port number so that, when the server's SIWF intercepts the message, it can complete the F-Spec part of the SDL in the response S34 to the INVITE message. The rest of the SIP 200 OK response message S34 is constructed from the contents of the INVITE message. As the 200 OK response travels back over the reverse path of the INVITE the various CSCFs install the QoS policies in Gateways to ensure that the bearer path described by the F-Spec receives the QoS treatment indicated by the T-Spec.

The client's SIWF converts the SIP 200 OK response S34 into a response to original SETUP message (an RSTP 200 OK response S36) and send that response on to the client. Unlike SIP, RTSP also has a set of methods (commands) to control the play out of media streams (e.g. to initiate a fast forward sequence). These commands only involve the server and do not need to be interpreted by the SIWFs. Included in this command set is the PLAY request, the server does not actually send any bearer stream packets until it has received a PLAY request. A TEARDOWN request S38 however is intercepted by the SIWF and translated into a SIP BYE message S40. Both RTSP's TEARDOWN and SIP's BYE message require an acknowledgement (200 OK) S42, S44.

Authorization and Accounting

One of the main benefits of the IMS architecture is users (in the form of SIP clients) are authenticated (during the REGISTRATION step) and the NGN generates accounting information tying users to the QoS bearer flows they request. Providing SIWF gateways in the NGN, as disclosed above, weakens these controls, since they allow unregistered end points to request and use network resources. In practical, commercial deployments, operators will need to pre-authorize one end of the hearer flows, likely the application servers because there are far fewer of them with whom to negotiate billing arrangements. Operators will administratively provision an application server's address into its serving SIWF and explicitly enable the inter-working function. The SIWF could be provisioned with a URL of the server that it registers with an s-CSCF, so that SIP messages can be routed to the SIWF using the URL as the destination-URI, rather than the Serving Gateway IP address method.

Selective Application of QoS

However, even when the application server is securely identified and a commercial arrangement is in place to bill it for the QoS bearer flows it sets up, the server is not able to choose whether a particular client receives QoS treatment or best effort treatment on the flows sent to it. (This may depend upon whether the client user has a subscription with the application server provider). A further refinement of the present invention, applicable for legacy protocols such as RTSP which identify media streams by URI, would have the application vise different URI's to identify otherwise identical media streams depending on whether they were to receive the QoS treatment, or not. All SIWFs in the NGN would have to be able to distinguish the two types of URI. Referring to FIG. 11 when a SETUP message arrives at the clients serving SIWF it would inspect the destination URI and only convert to the SETUP message to a SIP INVITE message if the URI indicates that QoS treatment was "requested" by the application server. Otherwise the SIWF function ignores the SETUP message and it proceeds to the application server in standard legacy fashion without further network involvement. Those experienced in the art will recognize that there are many schemes that could be used to differentiate URIs: one example would be to use the IMS domain name of the server's serving domain as the domain part of the URI appended after the application servers own URL.

Figure 12:
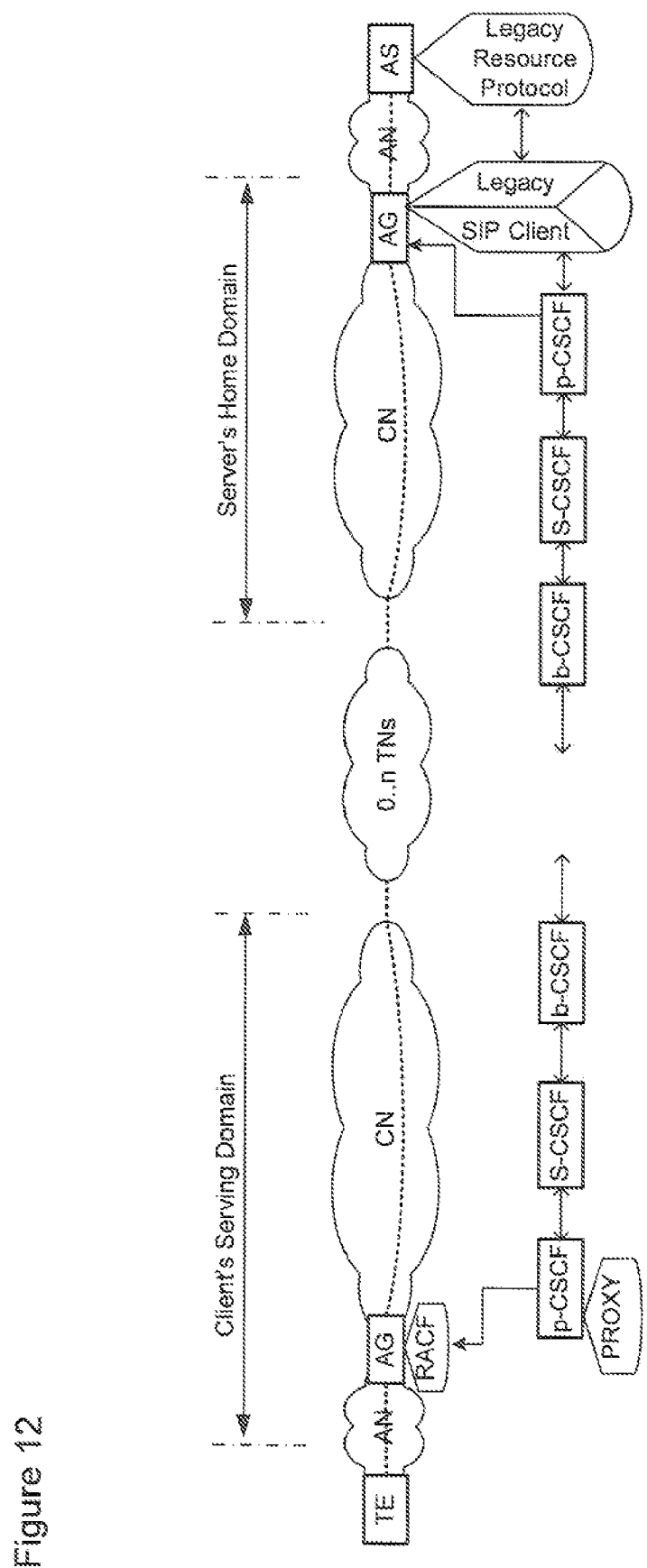
FIG. 12 is a block diagram schematically illustrating operation of a server for supporting interworking with legacy protocols in accordance with an aspect of the present invention.

In the third aspect of the invention described above, in order to establish a QoS bearer flow, the Server needs to be a SIP speaker but the protocol between server and client is ignored. On the other hand, in the fourth aspect described above, the protocol between client and server is converted into SIP. As may be appreciated, it is possible combine these two methods. FIG. 12 depicts an NGN embodiment that provides for QoS bearer paths between application servers and clients where the application sever uses a legacy signaling protocol to a local SIWF gateway to request QoS, and the SIWF gateway converts the signaling into SIP messages to the (p-CSCF controlling) the client TE's serving gateway.

There are two cases to consider.

Figure 13:
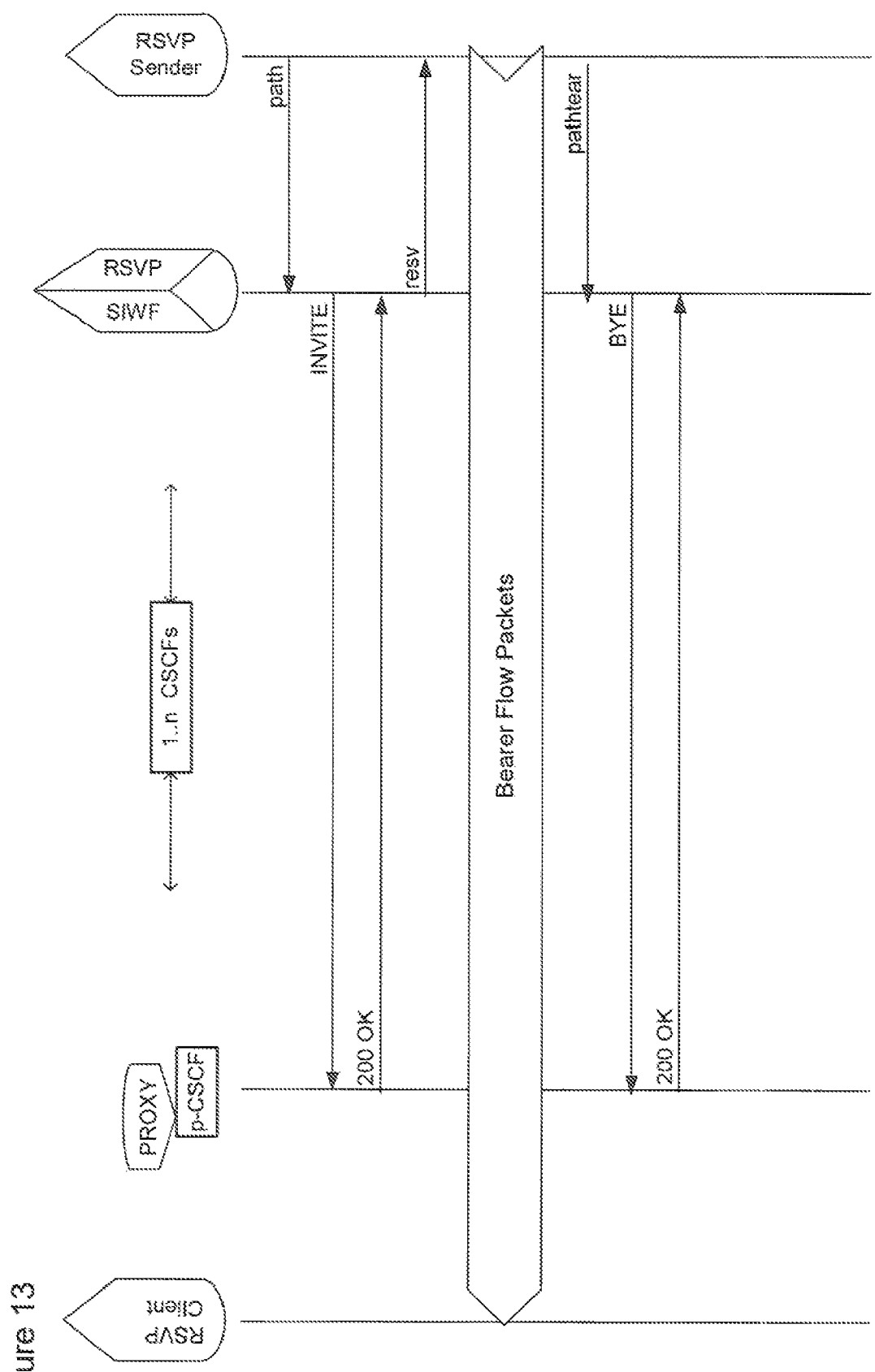
FIG. 13 is a message flow diagram schematically illustrating operation of a server for supporting RSVP to SIP interworking in accordance with an aspect of the present invention.

In one case, the client is not a speaker of the legacy signalling protocol. The server uses the legacy signalling protocol because it is easier to implement than SIP. This is illustrated in FIG. 13 for the case of RSVP. Note that while in this case when using RSVP the SIWF function (or at least the detection of RSVP messages) must be hosted in the Server's serving AG, for other protocols, such as RTSP, which allow for a proxy to be configured (i.e. the messages are IP addressed to the proxy) the SIWF function need not be in the direct path of packets between server and client. In particular the SIWF function could be included in the server's serving p-CSCF.

Figure 14:
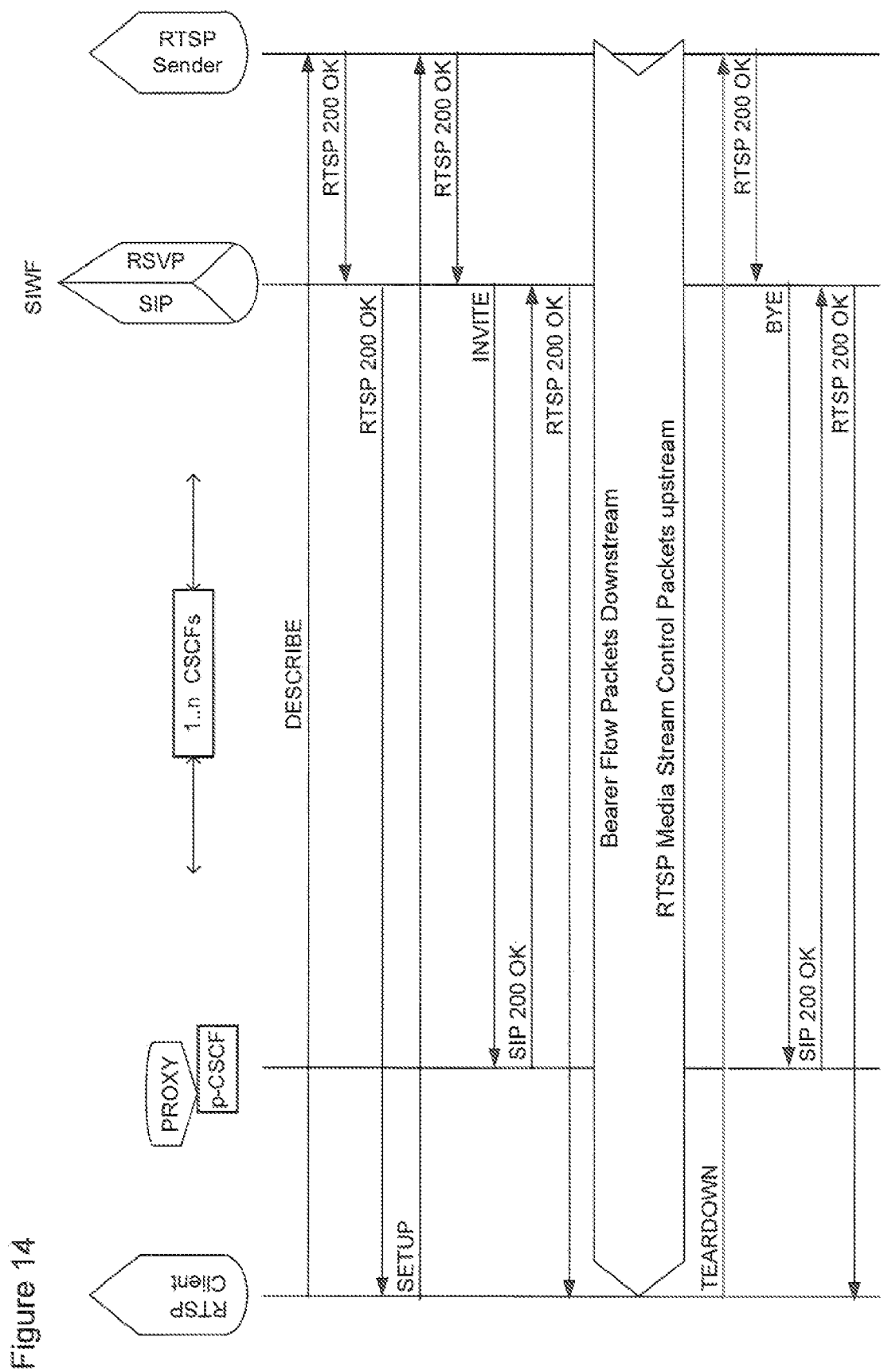
FIG. 14 is a message flow diagram schematically illustrating operation of a server for supporting RTSP to SIP interworking in accordance with an aspect of the present invention.

In the other case, the legacy signalling protocol is exchanged between client and server but it is also inspected, but not modified, by the server's SIWF. This is illustrated by FIG. 14 for the case of RTSP. In this case the SIWF function is acting as a transparent proxy (i.e. the RTSP packets are not addressed to it) and so must be part of the serving AG.

The methods and systems described herein thus overcome limitation of IMS today which only handles multimedia that is delivered over RTP between SIP speaking end points. The inventions described and claimed herein together allow any content to be delivered on QoS bearer flows from any content source to any destination, whilst maintaining the security and charging framework of IMS, opening up new sources of revenue for operators of next generation networks from customers and application service providers.

The embodiments of the invention described above are intended to be illustrative only. The scope of the invention is therefore intended to be limited solely by the scope of the appended claims.

I claim:

1. In an Internet Protocol (IP) multi-domain communication network in which an out of band signalling protocol is used to establish communications sessions, a method of establishing a bearer end-to-end path of a communication session, the method comprising steps of:
   receiving an out-of-band signalling message including information representative of at least an opposite end point of a first bearer segment of the end-to-end path;
   altering the information to define a cross-connect mapping through a gateway of the network between respective local endpoints of the first bearer segment and a second bearer segment hosted by the gateway, the gateway being selected to establish the bearer end-to-end path of the communication session;
   inserting the altered information representative of the cross-connect mapping into the out-of-band signalling message; and
   forwarding the out-of-band signalling message.

2. The method as claimed in claim 1, further comprising, when the out-of-band message is a forward phase message of the out-of-band signalling protocol, steps of:
   receiving a return phase message of the out-of-band signalling protocol from an opposite end point of the second bearer segment, the return phase message being generated by an opposite end-point of the end-to-end path in response to receipt of the out-of-band signalling message;
   defining a reverse phase cross-connect mapping through the selected gateway between respective local endpoints of the second bearer segment and the first bearer segment;

forwarding the return phase message to the opposite endpoint of the first bearer segment; and
establishing a bidirectional bearer end-to-end path based on the defined cross-connect mapping and the defined reverse phase cross-connect mapping through the selected gateway.

3. The method as claimed in claim 2, wherein out of band signalling protocol is Session Initiation Protocol (SIP), and wherein:
the forward phase message is a SIP INVITE message; and
the return phase signalling message is a SIP response message generated by a far end of the end-to-end path.

4. The method as claimed in claim 1, wherein the step of defining a cross-connect mapping comprises steps of:
identifying respective local endpoints of the first and second bearer segments; and
defining a mapping through the selected gateway between the identified local end-points.

5. The method as claimed in claim 1, wherein the step of inserting information representative of the cross-connect mapping into the out-of-band-signalling message comprises a step of inserting information identifying the local endpoint of the second bearer segment.

6. The method as claimed in claim 5, wherein the information identifying the local endpoint of the second bearer segment replaces the information identifying the opposite endpoint of the first bearer segment.

7. The method as claimed in claim 1, wherein the out-of-band signalling message is a SIP-INVITE message received at a Call State Control Function (CSCF) network element controlling the selected gateway, and wherein the step of defining a cross-connect mapping comprises steps of inserting into at least one control message information representative of the cross-connect mapping; transmitting the at least one control message to the selected gateway; and installing the cross-connect mapping as a forwarding policy of that selected gateway.

8. The method as claimed in claim 7, wherein, the step of forwarding the out-of-band message comprises a step of forwarding the SIP-INVITE message to a peer CSCF.

9. The method as claimed in claim 1, wherein the selected gateway is any one of: a border gateway between domains of the network; and a server within a domain of the network.

10. The method as claimed in claim 1, wherein the information is encoded in Session Description Protocol (SDP).

11. The method as claimed in claim 1, wherein the information comprises an IP flow specification including a respective IP address of at least one end-point of the bearer segment.

12. The method as claimed in claim 1, wherein the step of altering the information to define a cross-connect mapping comprises a step of defining a Network Address Translation (NAT) mapping for translating a header of IP packets received by the selected gateway through the first bearer segment into a header for the second bearer segment.

13. The method as claimed in claim 1, wherein the step of altering the information to define a reverse phase cross-connect mapping comprises a step of defining a corresponding reverse phase Network Address Translation (NAT) mapping for translating a header of IP packets received by the selected gateway through the second bearer segment into a header for the first bearer segment.

14. In an Internet Protocol (IP) multi-domain communication network in which an out of band signalling protocol is used to establish communications sessions, a Call State Control Function (CSCF) network element to establish a bearer end-to-end path of a communication session, the CSCF network element being operative to:

receive an out-of-band signalling message including information representative of at least an opposite end point of a first bearer segment of the end-to-end path;
alter the information to define a cross-connect mapping through a gateway of the network between respective local endpoints of the first bearer segment and a second bearer segment hosted by the gateway, the gateway being selected to establish the bearer end-to-end path of the communication session;
insert the altered information representative of the cross-connect mapping into the out-of-band signalling message; and
forward the out-of-band signalling message.

15. The network element as claimed in claim 14, wherein, when the out-of-band message is a forward phase message of the out-of band signalling protocol, the network element further being operative to:
receive a return phase message of the out-of-band signalling protocol from an opposite end point of the second bearer segment, the return phase message being generated by an opposite end-point of the end-to-end path in response to receipt of the out-of band signalling message;
define a reverse phase cross-connect mapping through the selected gateway between respective local endpoints of the second bearer segment and the first bearer segment;
forward the return phase message to the opposite end-point of the first bearer segment; and
establish a bidirectional bearer end-to-end path based on the defined cross-connect mapping and the defined reverse phase cross-connect mapping through the selected gateway.

16. The network element as claimed in claim 15, wherein out of band signalling protocol is Session Initiation Protocol (SIP), and wherein:
the forward phase message is a SIP INVITE message; and
the return phase signalling message is a SIP response message generated by a far end of the end-to-end path.

17. The network element as claimed in claim 14, wherein the network element is further being operative to:
identify respective local endpoints of the first and second bearer segments; and
define a mapping through the selected gateway between the identified local end-points.

18. The network element as claimed in claim 14, wherein the network element inserts information representative of the cross-connect mapping into the out-of band-signalling message, the inserted information identifying the local endpoint of the second bearer segment.

19. The network element as claimed in claim 18, wherein the information identifying the local endpoint of the second bearer segment replaces the information identifying the opposite end-point of the first bearer segment.

20. The network element as claimed in claim 14, wherein the out-of-band signalling message is a SIP-INVITE message received at a Call State Control Function (CSCF) network element controlling the selected gateway, and wherein while defining a cross-connect mapping the network element is being operative to insert into at least one control message information representative of the cross-connect mapping; transmit the at least one control message to the selected gateway; and install the cross-connect mapping as a forwarding policy of that selected gateway.

21. The network element as claimed in claim 20, wherein the step of forwarding the out-of-band message comprises a step of forwarding the SIP-INVITE message to a peer CSCF network element.

22. The network element as claimed in claim 14, wherein the selected gateway is any one of: a border gateway between IP domains of the network; and a server within an IP domain of the network.

23. The network element as claimed in claim 14, wherein the information is encoded in Session Description Protocol (SDP).

24. The network element as claimed in claim 14, wherein the information comprises an IP flow specification including a respective IP address of at least one end-point of the bearer segment.

25. The network element as claimed in claim 14, wherein network element defines a Network Address Translation (NAT) mapping for translating a header of IP packets received by the selected gateway through the first bearer segment into a header for the second bearer segment.

26. The network element as claimed in claim 25, wherein the network element defines a corresponding reverse phase Network Address Translation (NAT) mapping for translating a header of IP packets received by the selected gateway through the second bearer segment into a header for the first bearer segment.

* * * * *